United States Patent
Nakamura et al.

(10) Patent No.: US 7,864,281 B2
(45) Date of Patent: Jan. 4, 2011

(54) ACTIVE MATRIX SUBSTRATE AND DISPLAY UNIT PROVIDED WITH IT

(75) Inventors: Wataru Nakamura, Mie (JP); Atsushi Ban, Nara (JP); Shoji Okazaki, Mie (JP); Hiromitsu Katsui, Mie (JP); Yoshihiro Okada, Kanagawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 463 days.

(21) Appl. No.: 11/574,087

(22) PCT Filed: Aug. 23, 2005

(86) PCT No.: PCT/JP2005/015271

§ 371 (c)(1),
(2), (4) Date: Jul. 24, 2007

(87) PCT Pub. No.: WO2006/022259

PCT Pub. Date: Mar. 2, 2006

(65) Prior Publication Data

US 2007/0268438 A1 Nov. 22, 2007

(30) Foreign Application Priority Data

Aug. 24, 2004 (JP) ............................. 2004-243970
Aug. 12, 2005 (JP) ............................. 2005-235006

(51) Int. Cl.
*G02F 1/1333* (2006.01)

(52) U.S. Cl. ...................................... 349/138; 349/122

(58) Field of Classification Search .................. 349/138
See application file for complete search history.

(56) References Cited

U.S. PATENT DOCUMENTS 4,371,587 A * 2/1983 Peters ........................ 428/446

(Continued)

FOREIGN PATENT DOCUMENTS

JP          04-349430 A       12/1992

(Continued)

OTHER PUBLICATIONS

Official Communication for PCT Application No. PCT/JP2005/015271; mailed on Nov. 22, 2005.

(Continued)

*Primary Examiner*—David Nelms
*Assistant Examiner*—Erin D Chiem
(74) *Attorney, Agent, or Firm*—Keating & Bennett, LLP

(57) ABSTRACT

An active matrix substrate includes a substrate; scanning lines formed on the substrate; an insulating film covering the scanning lines; signal lines intersecting the scanning lines via the insulating film; switching elements formed on the substrate, each operating in response to a signal which is applied to the corresponding scanning line; and pixel electrodes each capable of being electrically connected to the corresponding signal line via the switching elements. The insulating film is a multilayer insulating film including a first insulating layer and a second insulating layer. The first insulating layer is formed of an insulating material containing an organic component, and the multilayer insulating film has a low-stack region in at least a portion of a region overlapping each switching element, the first insulating layer not being formed in the low-stack region. The active matrix substrate reduces the capacitance formed at each intersection between a scanning line and a signal line, without causing an increase in the wiring resistance or a degradation of the driving ability of switching elements.

27 Claims, 29 Drawing Sheets

U.S. PATENT DOCUMENTS

| | | | |
|---|---|---|---|
| 5,028,122 A | | 7/1991 | Hamada et al. |
| 5,186,745 A | * | 2/1993 | Maniar .................. 106/287.16 |
| 5,380,555 A | | 1/1995 | Mine et al. |
| 5,408,345 A | * | 4/1995 | Mitsui et al. ................... 349/42 |
| 5,981,972 A | | 11/1999 | Kawai et al. |
| 6,100,954 A | * | 8/2000 | Kim et al. ................... 349/138 |
| 6,184,960 B1 | * | 2/2001 | Sawayama et al. .......... 349/139 |
| 6,633,360 B2 | | 10/2003 | Okada et al. |
| 6,680,040 B1 | | 1/2004 | Nishida et al. |
| 6,704,085 B2 | | 3/2004 | Nishimura et al. |
| 6,861,479 B2 | | 3/2005 | Sezi |
| 6,958,791 B2 | | 10/2005 | Shimoshikiryo |
| 7,034,789 B2 | | 4/2006 | Takeuchi et al. |
| 7,079,214 B2 | | 7/2006 | Shimoshikiryo |
| 7,122,835 B1 | | 10/2006 | Ikeda et al. |

FOREIGN PATENT DOCUMENTS

| | | |
|---|---|---|
| JP | 05-061069 A | 3/1993 |
| JP | 06-112485 A | 4/1994 |
| JP | 06-240455 A | 8/1994 |
| JP | 07-056190 A | 3/1995 |
| JP | 09-236825 A | 9/1997 |
| JP | 10-102003 A | 4/1998 |
| JP | 11-017188 A | 1/1999 |
| JP | 2001-098224 A | 4/2001 |
| JP | 2002-258321 A | 9/2002 |
| JP | 2002-351356 A | 12/2002 |
| JP | 2003-315815 A | 11/2003 |
| JP | 2004-062146 A | 2/2004 |
| JP | 2004-078157 A | 3/2004 |

OTHER PUBLICATIONS

Choi et al., "Performance of TFT Passivated With Low-K Dielectrics", IDW 2003, pp. 617-620.

Official communication issued in the counterpart International Application No. PCT/JP2005/015271, mailed on Mar. 8, 2007.

Official Communication issued in corresponding EP05775080.4, mailed on May 6, 2009.

* cited by examiner (a)

(b)

(c)

(d)

ACTIVE MATRIX SUBSTRATE AND DISPLAY UNIT PROVIDED WITH IT

BACKGROUND OF THE INVENTION

1. Field of the Invention

The present invention relates to an active matrix substrate which is for use in a liquid crystal television set, a liquid crystal monitor device, a laptop computer, or the like. The present invention also relates to a display device including the active matrix substrate.

2. Description of the Related Art

Liquid crystal display devices are utilized in various fields because of their thinness and low power consumption. In particular, liquid crystal display devices of an active matrix type, comprising a switching element such as a thin film transistor (referred to as a "TFT") for each pixel, have a high contrast ratio and excellent response characteristics, and are used in television sets, monitor devices, and laptop computers because of their high performance. The market scale thereof has been increasing in the recent years.

On an active matrix substrate which is used in an active matrix type liquid crystal display device, a plurality of scanning lines and a plurality of signal lines which intersect these scanning lines via an insulating film are formed, and thin film transistors for switching the pixels are provided near the intersections between the scanning lines and the signal lines.

A capacitance which is formed at each intersection between a scanning line and a signal line (referred to as a "parasitic capacitance") may cause deterioration in the display quality. Therefore, it is preferable that the capacitance values of the parasitic capacitances are small.

Accordingly, Japanese Laid-Open Patent Publication No. 5-61069 (Patent Document 1) discloses a technique in which the scanning lines and signal lines are made narrower in width at such intersections than at any other portion, thus reducing the area of each intersection and reducing the parasitic capacitance which is formed at each intersection.

However, narrowing the width of the wiring lines, even if locally, will increase the resistance values of the wiring lines, thus causing signal blunting. Moreover, since narrowing the width of the wiring lines will lead to an increased probability of line breaking, it is generally necessary to secure about 50% of the original width. Therefore, the aforementioned technique of Patent Document 1 has its limit in reducing the parasitic capacitance of the intersections. In recent years, liquid crystal display devices have increased in size and resolution. In a large-sized and high-resolution liquid crystal display device, broader wiring line widths are used in order to reduce wiring resistance, and there is an increased number of intersections between wiring lines, which results in an increased parasitic capacitance formed at each intersection. This makes the aforementioned signal blunting more outstanding.

Another technique for reducing the capacitance which is generated at each intersection between a scanning line and a signal line might be to increase the thickness of the insulating film which covers the scanning lines. However, when an insulating film which covers the scanning lines partially functions as a gate insulating film, as in the case of bottom-gate type TFTs or the like, the driving ability of the TFTs will be degraded by increasing the thick of this insulating film.

SUMMARY OF THE INVENTION

The present invention has been made in view of the above problems, and an objective thereof is to provide: an active matrix substrate which can reduce the capacitance formed at each intersection between a scanning line and a signal line, without causing an increase in the wiring resistance or a degradation of the driving ability of switching elements; and a display device including the same.

An active matrix substrate according to a first aspect of the present invention is an active matrix substrate comprising: a substrate; a plurality of scanning lines formed on the substrate; an insulating film covering the plurality of scanning lines; a plurality of signal lines intersecting the plurality of scanning lines via the insulating film; a plurality of switching elements formed on the substrate, each operating in response to a signal which is applied to the corresponding scanning line; and a plurality of pixel electrodes each capable of being electrically connected to the corresponding signal line via the plurality of switching elements, wherein, the insulating film is a multilayer insulating film including a first insulating layer and a second insulating layer; the first insulating layer is formed of an insulating material containing an organic component; and the multilayer insulating film has a low-stack region in at least a portion of a region overlapping each switching element, the first insulating layer not being formed in the low-stack region. Thus, the aforementioned objective is met.

In a preferred embodiment, the first insulating layer is formed so as to underlie the second insulating layer.

In a preferred embodiment, the second insulating layer is formed of an inorganic insulating material.

In a preferred embodiment, each of the plurality of switching elements is a thin film transistor having: a semiconductor layer including a channel region; a gate electrode electrically connected to the corresponding scanning line; a source electrode electrically connected to the corresponding signal line; and a drain electrode electrically connected to the corresponding pixel electrode.

In a preferred embodiment, the multilayer insulating film has each low-stack region in a region overlapping at least the channel region.

In a preferred embodiment, the second insulating layer is formed over substantially the entire surface of the substrate; and the second insulating layer has portions each located between the gate electrode and the semiconductor layer, each portion functioning as a gate insulating film.

In a preferred embodiment, an edge of the gate electrode is covered by the first insulating layer.

In a preferred embodiment, a surface of the multilayer insulating film facing the signal lines is recessed in each low-stack region; and the semiconductor layer is formed so as to cover each low-stack region of the multilayer insulating film overlapping the channel region, in such a manner that a portion of the semiconductor layer rides over a region of the multilayer insulating film where the first insulating layer is formed.

In a preferred embodiment, the active matrix substrate according to the first aspect of the present invention further comprises: a plurality of storage capacitor lines formed on the substrate; and a plurality of storage capacitor electrodes opposing the plurality of storage capacitor lines via the insulating film, wherein, the multilayer insulating film also includes low-stack regions in between the storage capacitor lines and the storage capacitor electrodes.

In a preferred embodiment, edges of the storage capacitor lines are covered by the first insulating layer.

In a preferred embodiment, the multilayer insulating film also includes low-stack regions in portions of regions overlapping the signal lines.

In a preferred embodiment, the multilayer insulating film does not include any low-stack regions at intersections between the signal lines and the scanning lines.

In a preferred embodiment, the multilayer insulating film has slopes surrounding each low-stack region overlapping the signal lines; the slopes include a first portion parallel to a direction in which the signal lines extend, and a second portion substantially orthogonal to the direction in which the signal lines extend; and a tilt angle of the first portions with respect to a principal face of the substrate is greater than a tilt angle of the second portions with respect to the principal face of the substrate.

In a preferred embodiment, the active matrix substrate according to the first aspect of the present invention further comprises an interlayer insulating film formed of a photosensitive material so as to cover the plurality of signal lines and the plurality of switching elements, wherein, the plurality of pixel electrodes are formed on the interlayer insulating film; each of the plurality of pixel electrodes is connected to the corresponding switching element at a contact hole which is formed in the interlayer insulating film; and the multilayer insulating film does not have any low-stack region in a region overlapping the contact hole.

In a preferred embodiment, the active matrix substrate according to the first aspect of the present invention has a plurality of pixel regions arrayed in a matrix, wherein the plurality of pixel electrodes are respectively provided in the plurality of pixel regions.

In a preferred embodiment, the active matrix substrate according to the first aspect of the present invention has a display region defined by the plurality of pixel regions and a non-display region located around a perimeter of the display region, the non-display region having a plurality of terminals to which signals for driving the plurality of pixel regions are input, wherein, the multilayer insulating film has a low-stack region over substantially the entire surface of the non-display region.

In a preferred embodiment, the multilayer insulating film has an annular low-stack region near an outer periphery of each of the plurality of pixel regions.

An active matrix substrate according to a second aspect of the present invention is an active matrix substrate comprising: a substrate; a plurality of scanning lines formed on the substrate; an insulating film covering the plurality of scanning lines; a plurality of signal lines intersecting the plurality of scanning lines via the insulating film; a plurality of thin film transistors formed on the substrate, each operating in response to a signal which is applied to the corresponding scanning line; and a plurality of pixel electrodes each capable of being electrically connected to the corresponding signal line via the plurality of thin film transistors, wherein, each of the plurality of thin film transistors is a thin film transistor having: a gate electrode electrically connected to the corresponding scanning line; a source electrode electrically connected to the corresponding signal line; and a drain electrode electrically connected to the corresponding pixel electrode; the insulating film is a multilayer insulating film including a first insulating layer and a second insulating layer; the first insulating layer is formed of an insulating material containing an organic component, and is formed so as to underlie the second insulating layer; and the gate electrode is formed on the first insulating layer, and is formed of a conductive layer which is different from that of the plurality of scanning lines, the gate electrode being electrically connected to the corresponding scanning line via a contact hole which is provided in the first insulating layer. Thus, the aforementioned objective is met.

In a preferred embodiment, the second insulating layer is formed of an inorganic insulating material.

In a preferred embodiment, the second insulating layer is formed so as to cover the gate electrode, a portion of the second insulating layer functioning as a gate insulating film.

In a preferred embodiment, the active matrix substrate according to the second aspect of the present invention further comprises: a plurality of storage capacitor lines formed on the first insulating layer; and a plurality of storage capacitor electrodes opposing the plurality of storage capacitor lines via the second insulating layer.

In a preferred embodiment, the active matrix substrate according to the second aspect of the present invention has a plurality of pixel regions arrayed in a matrix, wherein the plurality of pixel electrodes are respectively provided in the plurality of pixel regions.

In a preferred embodiment, the active matrix substrate according to the second aspect of the present invention has a display region defined by the plurality of pixel regions and a non-display region located around a perimeter of the display region, the non-display region having a plurality of terminals to which signals for driving the plurality of pixel regions are input, wherein, the multilayer insulating film has a low-stack region over substantially the entire surface of the non-display region, the first insulating layer not being formed in the low-stack region.

In a preferred embodiment, the multilayer insulating film has an annular low-stack region near an outer periphery of each of the plurality of pixel regions, the first insulating layer not being formed in the annular low-stack region.

In a preferred embodiment, the first insulating layer is thicker than the second insulating layer, and has a lower relative dielectric constant than that of the second insulating layer.

In a preferred embodiment, the first insulating layer has a thickness of no less than 1.0 μm and no more than 4.0 μm.

In a preferred embodiment, the first insulating layer has a relative dielectric constant of 4.0 or less.

In a preferred embodiment, the first insulating layer is formed of a spin-on-glass (SOG) material having an Si—O—C bond backbone.

In a preferred embodiment, the first insulating layer is formed of a spin-on-glass (SOG) material having an Si—C bond backbone.

In a preferred embodiment, the first insulating layer is formed of a spin-on-glass (SOG) material containing a filler composed of silica.

In a preferred embodiment, the plurality of scanning lines have a wiring layer on at least the insulating film side, the wiring layer being composed of Ti or TiN.

In a preferred embodiment, an active matrix substrate according to the present invention has a plurality of shield electrodes extending substantially parallel to the plurality of signal lines.

In a preferred embodiment, the plurality of shield electrodes are located so as to overlap edges of the plurality of pixel electrodes.

A display device according to the present invention comprises: an active matrix substrate of the aforementioned construction; and a display medium layer located on the active matrix substrate. Thus, the aforementioned objective is met.

In a preferred embodiment, a display device according to the present invention further comprises a counter substrate which opposes the active matrix substrate via the display medium layer, the display medium layer being a liquid crystal layer.

In an active matrix substrate according to the present invention, an insulating film covering scanning lines is a multilayer insulating film including a first insulating layer and a second insulating layer, the first insulating layer being formed of an insulating material containing an organic component. Therefore, the capacitance which is formed at each intersection between a scanning line and a signal line can be reduced.

According to a first aspect of the present invention, the multilayer insulating film has a low-stack region in at least a portion of a region overlapping each switching element, the first insulating layer not being formed in the low-stack region. Therefore, the driving ability of the switching elements is not degraded.

Moreover, according to a second aspect of the present invention, the gate electrode of each thin film transistor is formed on the first insulating layer, and is formed of a conductive layer which is different from that of the scanning lines, the gate electrode being electrically connected to a scanning line via a contact hole which is provided in the first insulating layer. Therefore, the driving ability of the thin film transistors (switching elements) is not degraded.

As described above, according to the present invention, the capacitance which is formed at each intersection between a scanning line and a signal line can be reduced without degradation of the driving ability of the switching elements.

BRIEF DESCRIPTION OF THE DRAWINGS

FIGS. 4(a) to (f) are step cross-sectional views schematically showing production steps for the TFT substrate 100a.

FIGS. 9(a) to (f) are step cross-sectional views schematically showing production steps for the TFT substrate 200a.

FIG. 10 is an upper plan view schematically showing the TFT substrate 200a.

DETAILED DESCRIPTION OF PREFERRED EMBODIMENTS

Hereinafter, embodiments of the present invention will be described with reference to the drawings. Note that the present invention is not to be limited to the embodiments below.

Embodiment 1

Figure 1:
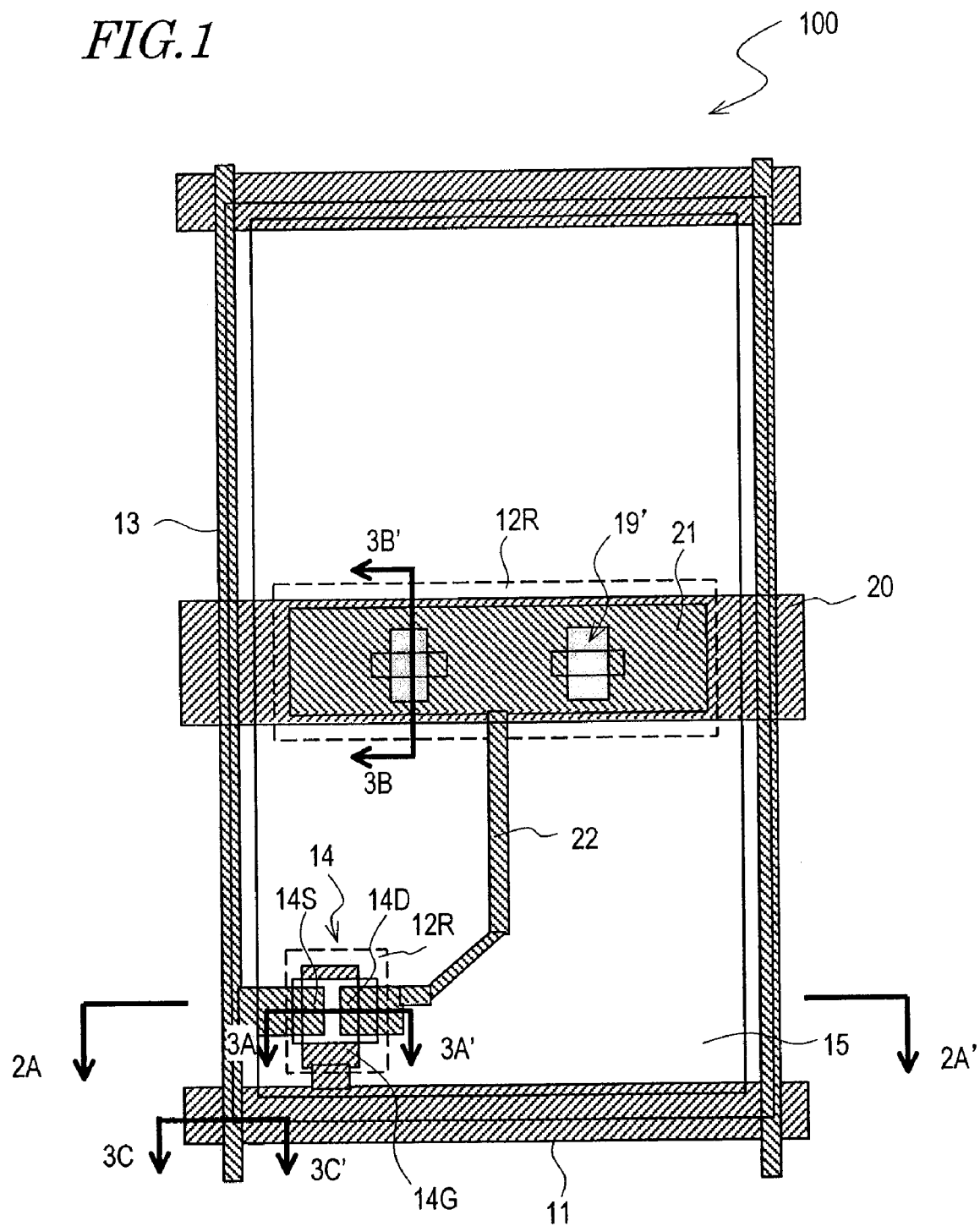
FIG. 1 is an upper plan view schematically showing a liquid crystal display device 100 according to a first embodiment of the present invention.
Figure 2:
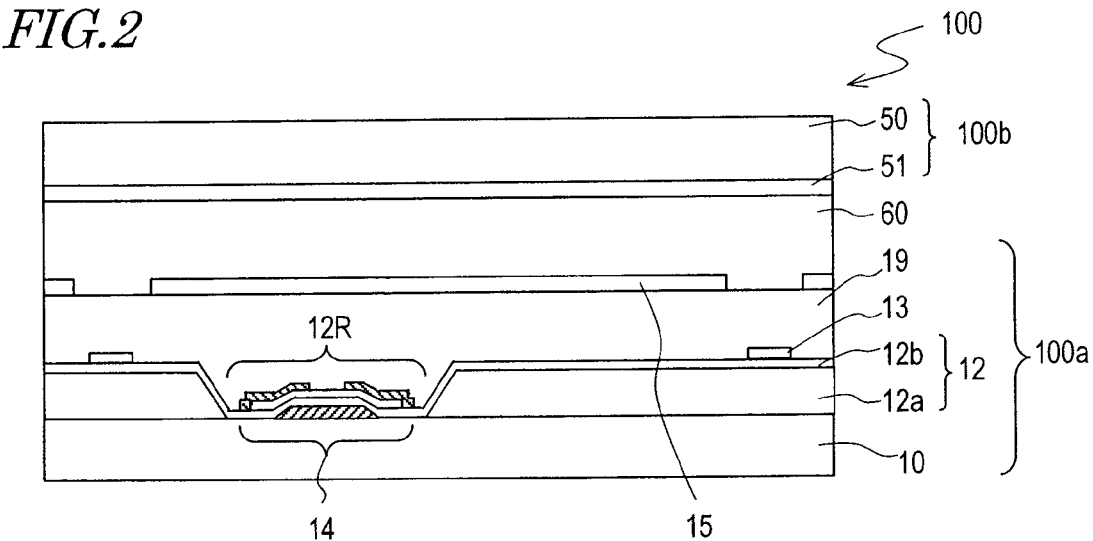
FIG. 2 is a cross-sectional view schematically showing the liquid crystal display device 100, showing a cross section taken along line 2A-2A' in FIG. 1.

FIG. 1 and FIG. 2 show a liquid crystal display device 100 according to the present embodiment. FIG. 1 is an upper plan view schematically showing one pixel region of the liquid crystal display device 100. FIG. 2 is a cross-sectional view taken along line 2A-2A' in FIG. 1.

The liquid crystal display device 100 includes: an active matrix substrate (hereinafter referred to as a "TFT substrate") 100a; a counter substrate opposing the TFT substrate 100a (also referred to as a "color filter substrate") 100b; and a liquid crystal layer 60 interposed therebetween.

The TFT substrate 100a includes: a transparent insulative substrate (e.g., a glass substrate) 10; a plurality of scanning lines 11 formed on the substrate 10; an insulating film 12 covering the scanning lines 11; and a plurality of signal lines 13 intersecting the scanning lines 11 via the insulating film 12.

Furthermore, in each pixel region, the TFT substrate 100a includes: a thin film transistor (TFT) 14 which operates in response to a signal that is applied to the corresponding scanning line 11; and a pixel electrode 15 which can be electrically connected to the corresponding signal line 13 via the TFT 14 acting as a switching element.

The counter substrate 100b includes: a transparent insulative substrate (e.g., a glass substrate) 50; and a counter electrode 51 which is formed on the substrate 50 and opposes the pixel electrode 15. Typically, the counter substrate 100b further includes color filters.

The liquid crystal layer 60 changes its orientation state in accordance with a voltage which is applied between the pixel electrode 15 and the counter electrode 51, and thus modulates light which passes through the liquid crystal layer 60, whereby display is performed. As the liquid crystal layer 60, liquid crystal layers for various display modes can be broadly used. For example, a liquid crystal layer for the TN (Twisted Nematic) mode, which utilizes optical rotary action, or a liquid crystal layer for the ECB (Electrically Controlled Birefringence) mode, which utilizes birefringence, can be used.

Within the ECB mode, the VA (Vertically Aligned) mode is able to achieve a high contrast ratio. A liquid crystal layer for the VA mode is typically obtained by providing vertical alignment layers on both sides of a liquid crystal layer containing a liquid crystal material that has negative dielectric anisotropy.

Figure 3:
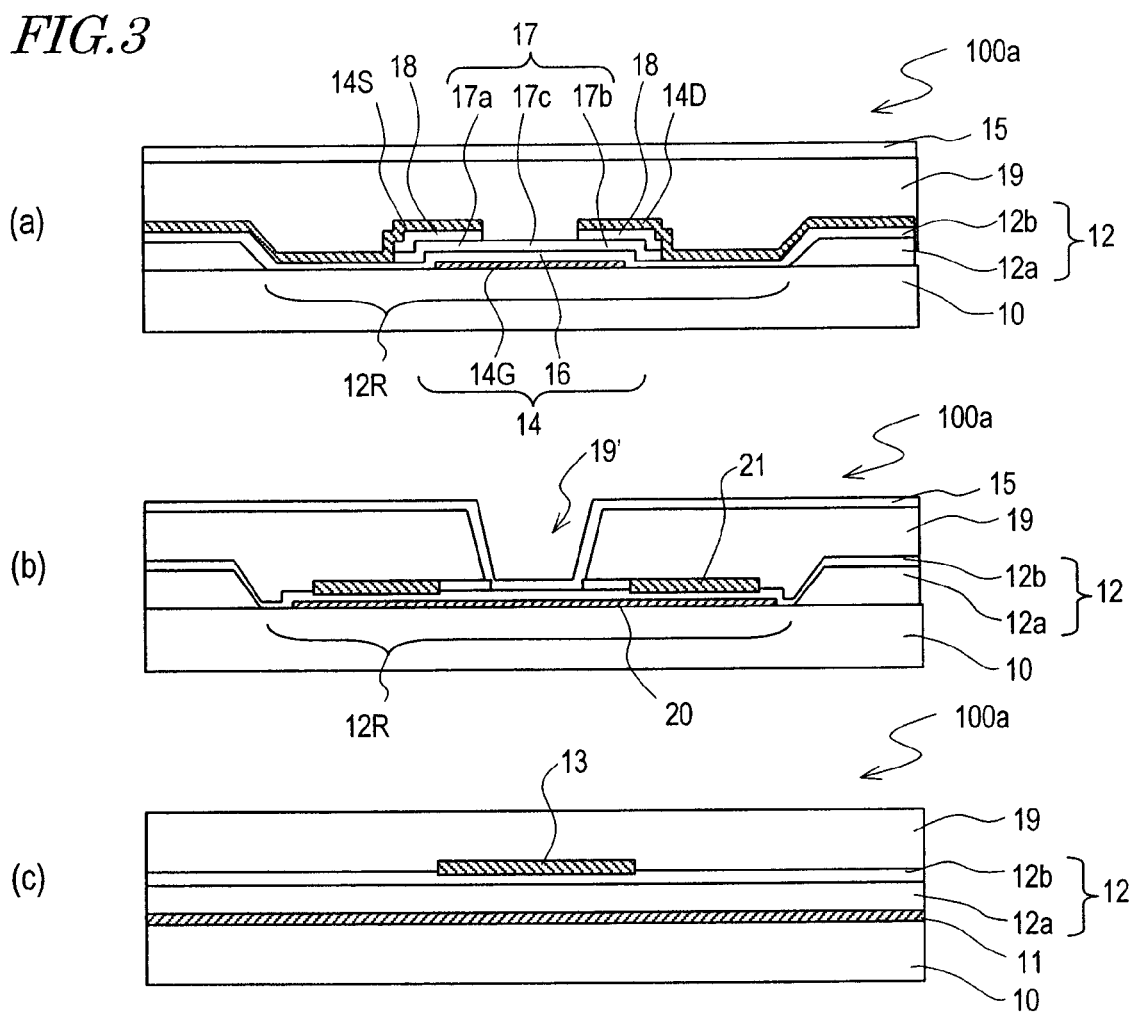
FIGS. 3(a) to (c) are cross-sectional views schematically showing a TFT substrate 100a of the liquid crystal display device 100, each showing a cross section taken along line 3A-3A', line 3B-3B', or line 3C-3C' in FIG. 1, respectively.

Hereinafter, while also referring to FIG. 3, the construction of the TFT substrate 100a will be described in more detail. FIG. 3(a) is a cross-sectional view taken along line 3A-3A' in FIG. 1; FIG. 3(b) is a cross-sectional view taken along line 3B-3B' in FIG. 1; and FIG. 3(c) is a cross-sectional view taken along line 3C-3C' in FIG. 1.

As shown in FIG. 3(a), a TFT 14 on the TFT substrate 100a includes: a gate electrode 14G which is electrically connected to a scanning line 11; a source electrode 14S which is electrically connected to a signal line 13; and a drain electrode 14D which is electrically connected to a pixel electrode 15. Moreover, the TFT 14 has a laminate structure such that the gate electrode 14G, a gate insulating film 16, and an intrinsic semiconductor layer (which may hereinafter be simply referred to as a "semiconductor layer") 17, and an impurity-added semiconductor layer 18 are sequentially stacked from below. Via the impurity-added semiconductor layer 18 functioning as a contact layer, a source region 17a and a drain region 17b of the semiconductor layer 17 are electrically connected to the source electrode 14S and the drain electrode 14D. A region of the semiconductor layer 17 that lies between the source region 17a and the drain region 17b functions as a channel region 17c, such that the impurity-added semiconductor layer 18 does not exist on the upper face of the channel region 17c.

Moreover, as shown in FIG. 3(b), the TFT substrate 100a also includes: a plurality of storage capacitor lines 20 which are formed on the substrate 10; and a plurality of storage capacitor electrodes 21 opposing the plurality of storage capacitor lines 20 via the insulating film 12. Thus, a so-called Cs On Com structure is adopted for the TFT substrate 100a. The storage capacitor lines 20 are formed by patterning the same conductive film as that of the scanning lines 11 and the gate electrodes 14G. The storage capacitor electrodes 21 are formed by patterning the same conductive film as that of the signal lines 13, the source electrode 14S and the drain electrodes 14D, each being electrically connected to the drain electrode 14D of the TFT 14 via a conductive member 22 which extends from the drain electrode 14D as shown in FIG. 1.

An interlayer insulating film 19 is formed so as to cover the TFTs 14 and the signal lines 13 mentioned above, and the pixel electrodes 15 are formed on the interlayer insulating film 19. As shown in FIG. 3(b), each pixel electrode 15 is connected to a storage capacitor electrode 21 at a contact hole 19' which is formed in the interlayer insulating film 19, and is electrically connected to the drain electrode 14D of the TFT 14 via the storage capacitor electrode 21.

In the TFT substrate 100a of the present embodiment, as shown in FIG. 3(c), the insulating film 12 covering the scanning lines 11 is a multilayer insulating film which includes a first insulating layer 12a and a second insulating layer 12b. The first insulating layer 12a is formed so as to underlie the second insulating layer 12b, and is formed of an insulating material containing an organic component. On the other hand, the second insulating layer 12b is formed of an inorganic insulating material such as $SiN_x$ or $SiO_x$.

As shown in FIG. 3(c), the first insulating layer 12a is formed in a large part of the substrate 10, including intersections between scanning lines 11 and signal lines 13, but, as shown in FIG. 3(a), the first insulating layer 12a is not formed in any portion where the insulating film 12 overlaps a TFT 14. On the other hand, the second insulating layer 12b is formed over substantially the entire surface of the substrate 10, and is also formed in any portion where the insulating film 12 overlaps a TFT 14. Each portion of the second insulating layer 12b that is located between a gate electrode 14G and the semiconductor layer 17 functions as the gate insulating film 16. Thus, the multilayer insulating film 12 includes, in a region overlapping each TFT 14, a low-stack region 12R where the first insulating layer 12a is not formed. Note that FIG. 1 shows a low-stack region 12R as a region surrounded by a broken line.

Moreover, as shown in FIG. 3(b), the first insulating layer 12a is also not formed between any storage capacitor line 20 and any storage capacitor electrode 21, so that only the second insulating layer 12b functions as a dielectric film for the storage capacitor. In other words, the multilayer insulating film 12 also has a low-stack region 12R between the storage capacitor line 20 and the storage capacitor electrode 21.

In the TFT substrate 100a of the present embodiment, as described above, the insulating film 12 covering the scanning lines 11 is a multilayer insulating film including the first insulating layer 12a and the second insulating layer 12b. Furthermore, the multilayer insulating film 12 includes low-stack regions 12R (where the first insulating layer 12a is not formed) in regions overlapping the TFTs 14 and in between storage capacitor lines 20 and storage capacitor electrodes 21. As a result, the capacitance which is formed at each intersection between a scanning line 11 and a signal line 13 can be reduced without degradation of the driving ability of the TFT 14 or decrease in the capacitance value of the storage capacitor.

In order to sufficiently reduce the capacitance of each intersection between a scanning line 11 and a signal line 13, it is preferable that the first insulating layer 12a is thicker than the second insulating layer 12b and has a lower relative dielectric constant than that of the second insulating layer 12b.

The second insulating layer 12b, which also functions as the gate insulating film 16, typically has a thickness of about 0.2 μm to about 0.4 μm, and a relative dielectric constant of about 5.0 to about 8.0. On the other hand, it is preferable that the first insulating layer 12a has a thickness of no less than 1.0 μm and no more than 4.0 μm, and that the first insulating layer 12a has a relative dielectric constant of 4.0 or less.

As the material of the first insulating layer 12a, a spin-on-glass material (so-called organic SOG material) containing an organic component can be suitably used. In particular, an SOG material having an Si—O—C bond backbone or an SOG material having an Si—C bond backbone can be suitably used. An SOG material is a material which can be formed into a glass film (silica-type coating) by an application technique such as the spin coating technique. Since an organic SOG material has a low relative dielectric constant and is easily formed into a thick film, use of an organic SOG material reduces the relative dielectric constant of the first insulating layer 12a and makes it easy to form a thick first insulating layer 12a. As an SOG material having an Si—O—C bond backbone, for example, materials which are disclosed in Japanese Laid-Open Patent Publication No. 2001-98224 and Japanese Laid-Open Patent Publication No. 6-240455, or DD1100 manufactured by Dow Corning Toray, which is disclosed in IDW'03 preprints, p. 617, can be used. As an SOG material having an Si—C bond backbone, for example, a material which is disclosed in Japanese Laid-Open Patent Publication No. 10-102003 can be used.

Next, an exemplary method for producing the TFT substrate 100a will be described with reference to FIGS. 4(a) to (f).

First, on an insulative substrate 10 such as a glass substrate, a molybdenum (Mo) film, an aluminum (Al) film, and a molybdenum (Mo) film are stacked in this order by using sputtering technique, and this laminate film is patterned by using photolithography technique, thus forming a gate electrode 14G as shown in FIG. 4(a). A scanning line 11 and a storage capacitor line 20 (not shown) are also formed concurrently. Herein, the Mo/Al/Mo laminate film has respective thicknesses of 150 nm, 200 nm, and 50 nm from its uppermost layer.

Next, an organic SOG material is applied on the substrate 10 by using spin coating technique, followed by a pre-baking and a post-baking to form the first insulating layer 12a. Thereafter, as shown in FIG. 4(b), by using photolithography technique, predetermined portions of the first insulating layer 12a, specifically, a portion overlapping the gate electrode 14G and the neighborhood thereof, and a portion overlapping the storage capacitor line 20 and the neighborhood thereof, are removed. Herein, the organic SOG material is first applied to a thickness of 1.5 μm, and then a hot plate is used to perform 5 minutes of pre-baking at 150° C., and thereafter an oven is used to perform 1 hour of post-baking at 350° C., thereby forming a first insulating layer 12a having a relative dielectric constant of 2.5. In the case of etching, a gaseous mixture of carbon tetrafluoride ($CF_4$) and oxygen ($O_2$) is used to perform a dry etching.

Then, by using CVD technique, an $SiN_x$ film, an amorphous silicon (a-Si) film, and an $n^+$ amorphous silicon ($n^+$ a-Si) film are consecutively deposited. Thereafter, the a-Si film and the $n^+$ a-Si film are patterned by using photolithography technique (a portion of the $n^+$ a-Si film and the a-Si film are removed by dry etching). As a result, as shown in FIG. 4(c), an island-like semiconductor structure (semiconductor active layer region) is formed which is composed of a second insulating layer 12b (a portion of which functions as a gate insulating film 16), an intrinsic semiconductor layer 17, and an impurity-added semiconductor layer 18. Herein, a second insulating layer 12b having a thickness of 0.4 μm and a relative dielectric constant of 7.0 is formed, and an intrinsic semiconductor layer 17 having a thickness of about 50 nm to about 200 nm and an impurity-added semiconductor layer 18 having a thickness of about 40 nm are formed.

Thereafter, by sputtering technique, an Mo film, an Al film, an Mo film are formed in this order, and this laminate film is patterned by photolithography technique, whereby a source electrode 14S, a drain electrode 14D, a signal line 13, and a storage capacitor electrode 12 are formed.

Next, as shown in FIG. 4(d), in a region 17c to become a channel of the island-like semiconductor structure, the impurity-added semiconductor layer 18 is removed by dry etching, using the source electrode 14S and the drain electrode 14D as a mask. Note that, when removing the impurity-added semiconductor layer 18, the surface of the intrinsic semiconductor layer 17 is also slightly etched.

Next, as shown in FIG. 4(e), $SiN_x$ is deposited by using CVD technique, thus forming an interlayer insulating film 19 having a thickness of about 150 nm to about 700 nm so as to cover essentially the entire surface of the substrate 10. Thereafter, a contact hole 19' is formed by using photolithography technique. Note that an organic type insulating material (e.g., a photosensitive resin material) may be used as the material of the interlayer insulating film 19 to form a film having a thickness of about 1.0 μm to about 3.0 μm. The interlayer insulating film 19 may have a laminate structure in which a film which is formed of an inorganic insulating material such as $SiN_x$ and a film which is formed of the aforementioned organic-type insulating material are stacked.

Figure 4:
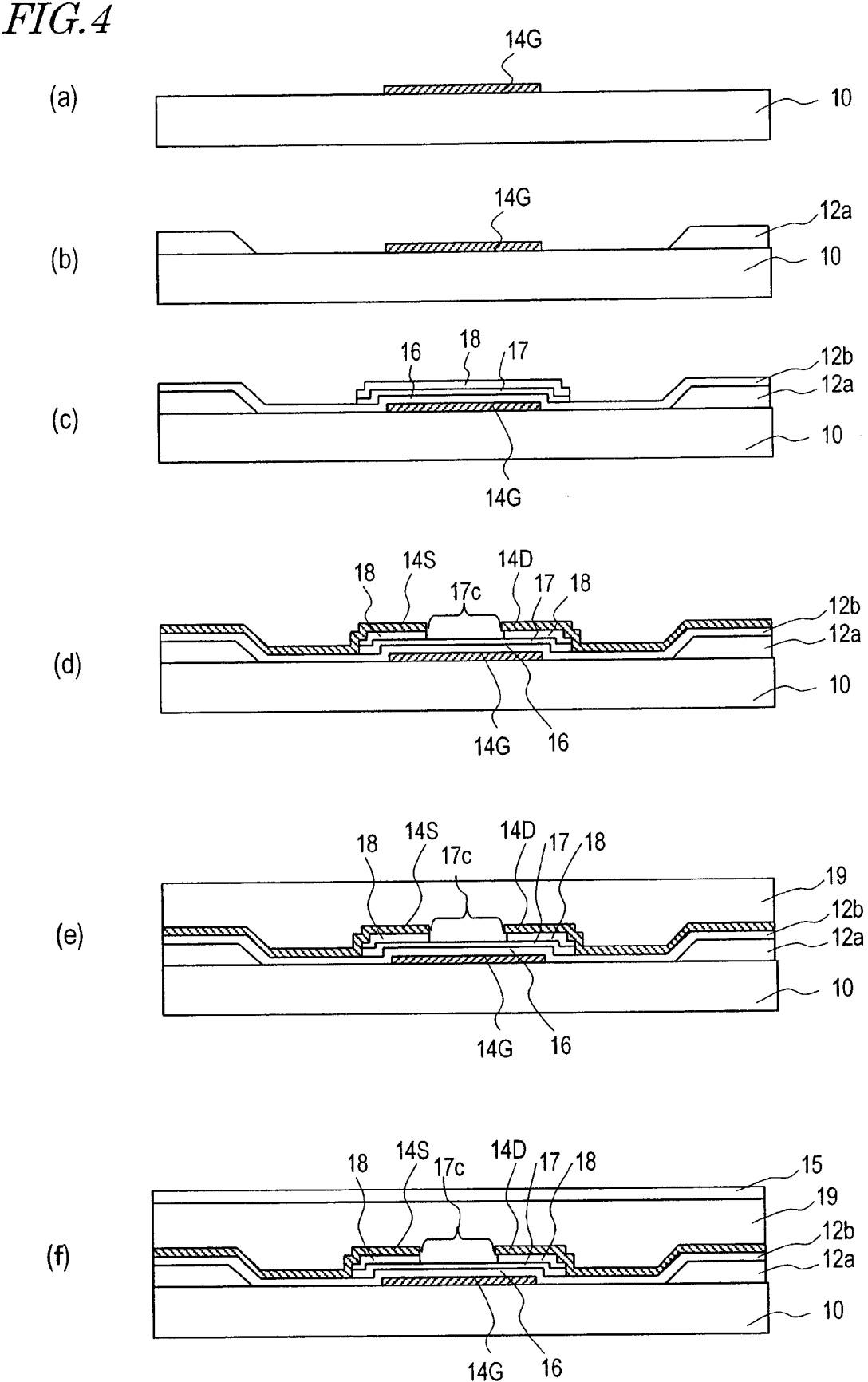

Finally, an ITO film having a thickness of 100 nm is formed by using sputtering technique, and this ITO film is patterned by using photolithography technique (wet etching is to be used in the case of etching), whereby a pixel electrode 15 is formed as shown in FIG. 4(*f*). Note that the material of the pixel electrode 15 is not limited to a transparent conductive material such as ITO as exemplified herein, but a light-reflective metal material such as Al may also be used.

The TFT substrate 100*a* is completed in the above manner. With the method exemplified herein, a multilayer insulating film 12 which includes a first insulating layer 12*a* having a thickness of 1.5 µm and a relative dielectric constant of 2.5 and a second insulating layer 12*b* having a thickness of 0.4 µm and a relative dielectric constant of 7.0 is formed. Therefore, the capacitance formed at each intersection between a scanning line 11 and a signal line 13 has a capacitance value of $1.48 \times 10^{-5}$ pF/µm$^2$ per unit area. On the other hand, in the case where only a gate insulating film having a thickness of 0.4 µm and a relative dielectric constant of 7.0 (corresponding to the first insulating layer 12*a* in the present embodiment) is formed between each scanning line and each signal line, as in a conventional active matrix substrate, the capacitance value per unit area will be $1.55 \times 10^{-4}$ pF/µm$^2$. Thus, the construction of the present embodiment reduces the value of the capacitance which is formed at each intersection to ¹⁄₁₀ or less. Moreover, since the first insulating layer 12*a* also exists between each scanning line 11 and each pixel electrode 15, the capacitance value can also be greatly reduced at each intersection between a scanning line 11 and a pixel electrode 15.

Note that, in the present embodiment, the first insulating layer 12*a* is formed in a large part of the substrate 10 although the multilayer insulating film 12 includes low-stack regions 12R where the first insulating layer 12*a* is not formed. On the other hand, as in a liquid crystal display device 700 shown in FIG. 5, a construction might be possible where a first insulating layer 12*a* is selectively provided so as to exist only at intersections between scanning lines 11 and signal lines 13. However, as can be seen from a comparison between FIG. 2 and FIG. 5, such a construction will make the interval between each signal line 13 and the counter electrode 51 shorter than in the construction shown in FIG. 2, so that the value of the capacitance which is formed between the signal line 13 and the counter electrode 51 will be increased.

As in the present embodiment, by forming the first insulating layer 12*a* also in places other than the intersections between scanning lines 11 and signal lines 13, each capacitance formed between a scanning line 11 and a signal line 13 can be reduced without increasing each capacitance formed between a signal line 13 and the counter electrode 51.

Figure 5:
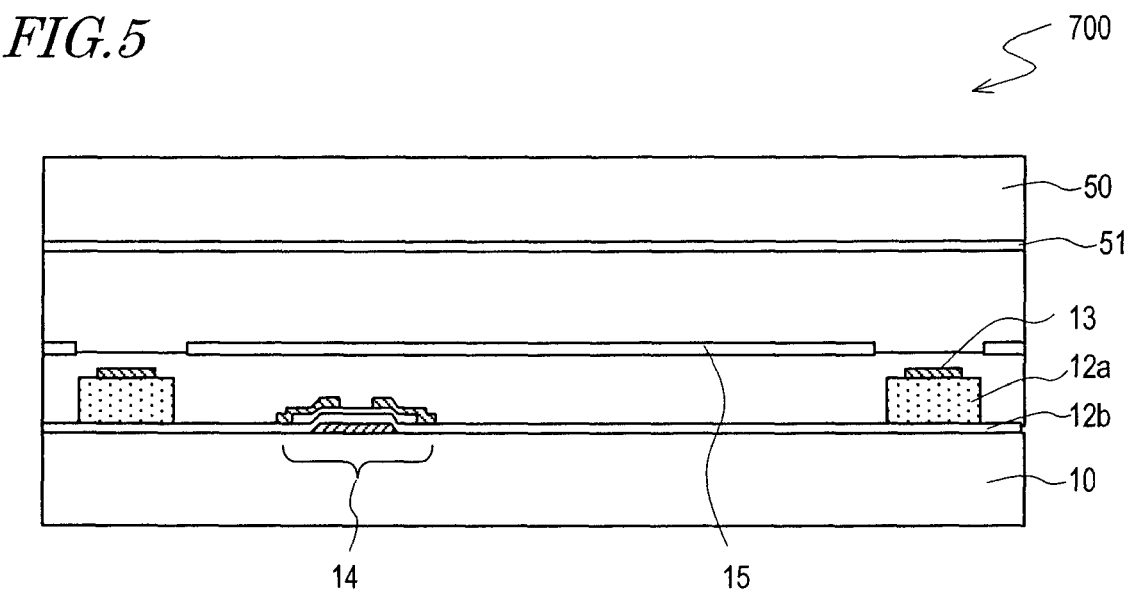
FIG. 5 is a cross-sectional view schematically showing a liquid crystal display device 700 in which a first insulating layer is selectively provided at intersections between scanning lines and signal lines.

Moreover, while FIG. 5 shows a construction where the first insulating layer 12*a* is formed above the second insulating layer 12*b*, such a construction may allow the first insulating layer 12*a*, which is formed of an insulating material containing an organic component, to be deteriorated during a dry etching when forming the signal lines 13 and the like.

On the other hand, by forming the first insulating layer 12*a* so as to underlie the second insulating layer 12*b* as in the present embodiment, the first insulating layer 12*a* will be covered with the second insulating layer 12*b* during a dry etching for forming the signal lines 13 and the like. Therefore, deterioration of the first insulating layer 12*a* can be prevented.

Embodiment 2

Figure 6:
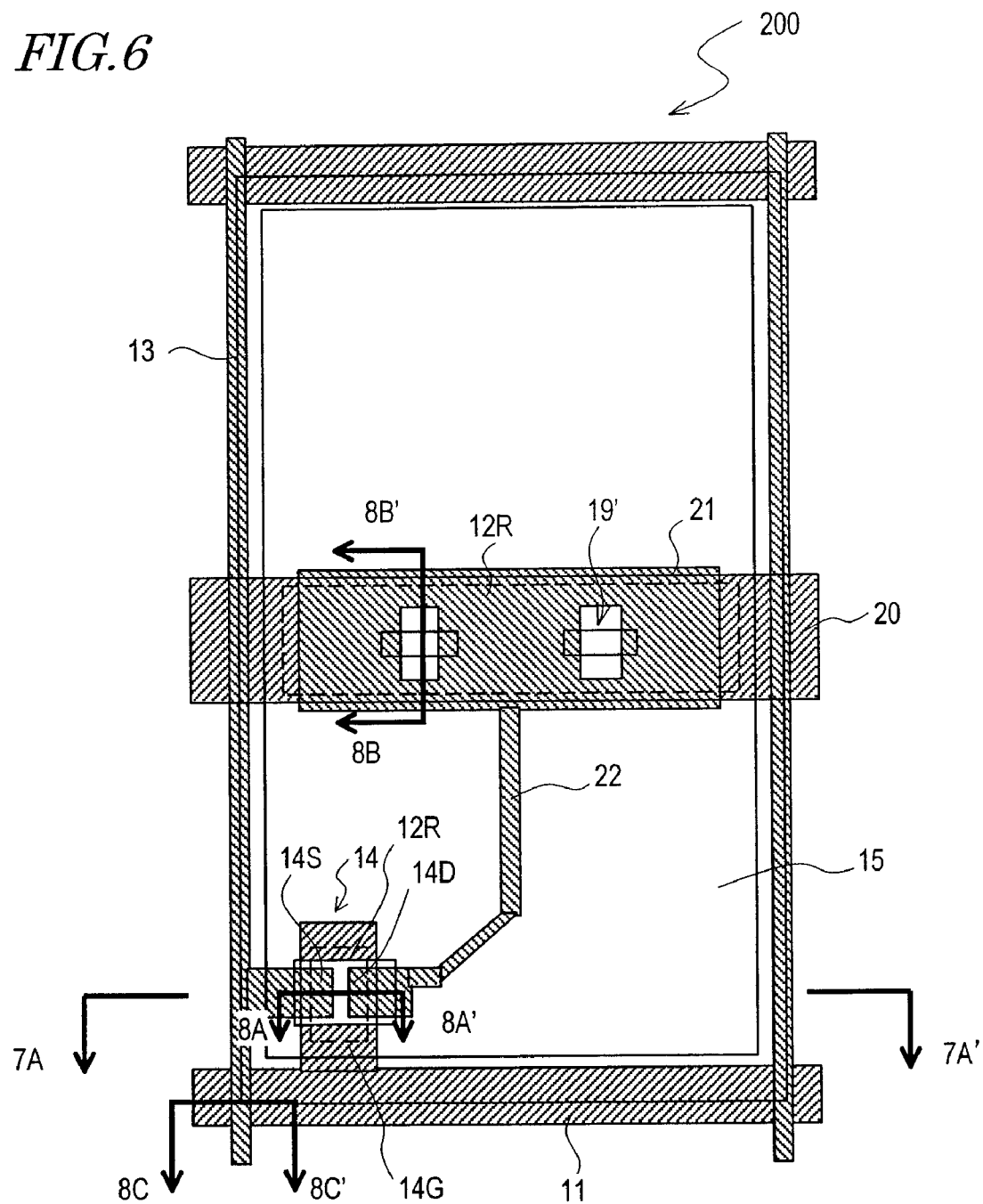
FIG. 6 is an upper plan view schematically showing a liquid crystal display device 200 according to a second embodiment of the present invention.
Figure 7:
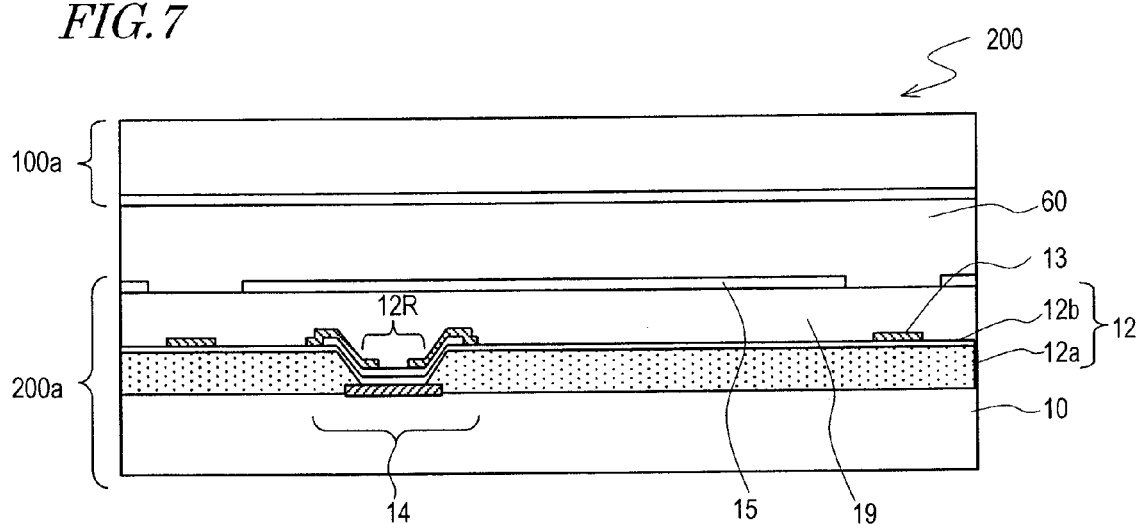
FIG. 7 is a cross-sectional view schematically showing a liquid crystal display device 200, showing a cross section taken along line 7A-7A' in FIG. 6.
Figure 8:
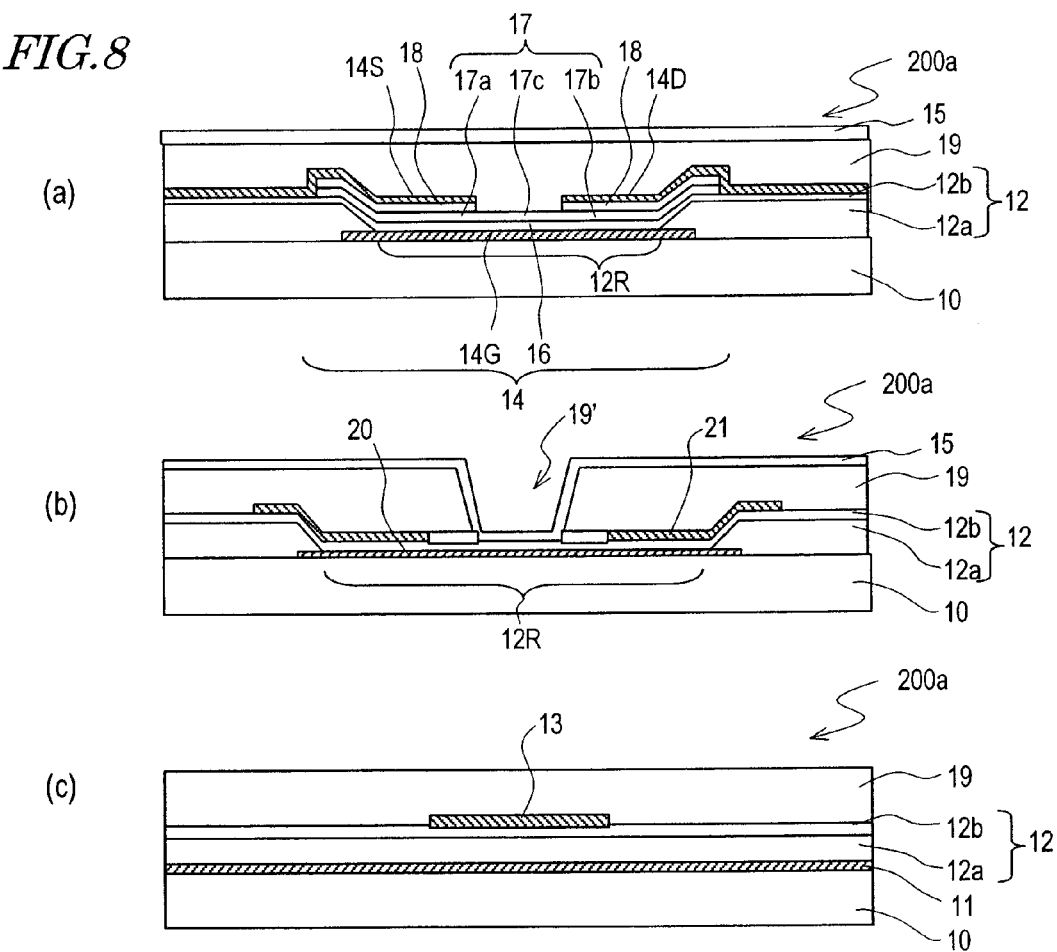
FIGS. 8(a) to (c) are cross-sectional views schematically showing a TFT substrate 200a of the liquid crystal display device 200, each showing a cross section taken along line 8A-8A', line 8B-8B', or line 8C-8C' in FIG. 6, respectively.

With reference to FIG. 6, FIG. 7, and FIGS. 8(*a*) to (*c*), a liquid crystal display device 200 according to the present embodiment will be described. Hereinafter, differences from the liquid crystal display device 100 of Embodiment 1 will be mainly described.

The TFT substrate 200*a* of the liquid crystal display device 200 differs from the TFT substrate 100*a* of the liquid crystal display device 100 with respect to the location of the low-stack regions 12R of the multilayer insulating film 12. As shown in FIG. 6, FIG. 7, and FIG. 8(*a*), the multilayer insulating film 12 of the TFT substrate 200*a* includes a low-stack region 12R (where the first insulating layer 12*a* is not formed) in each portion overlapping the channel region 17*c*. However, the first insulating layer 12*a* is not removed in all region above the gate electrode 14G, but rather covers edges of the gate electrode 14G. Moreover, as shown in FIG. 6 and FIG. 8(*b*), the first insulating layer 12*a* is not removed in all regions above the storage capacitor line 20, but covers edges of the storage capacitor line 20.

In the TFT substrate 200*a* of the present embodiment, too, the insulating film 12 covering the scanning lines 11 is a multilayer insulating film which includes a first insulating layer 12*a* and a second insulating layer 12*b*, and the multilayer insulating film 12 includes a low-stack region 12R (where the first insulating layer 12*a* is not formed) in regions overlapping the channel regions 17*c* and in between storage capacitor lines 20 and storage capacitor electrodes 21. Therefore, the capacitance which is formed at each intersection between a scanning line 11 and a signal line 13 can be reduced without degradation of the driving ability of the TFT 14 or decrease in the capacitance value of the storage capacitor.

In the present embodiment, furthermore, edges of the gate electrode 14G and edges of the storage capacitor line 20 are covered by the first insulating layer 12*a*. Such a construction will result in advantages described below.

In a traditional active matrix substrate, an electric current leak is likely to occur between an edge portion of the scanning line layer (which is a generic name for any element that is formed from the same conductive film as that of the scanning lines and scanning lines) and a signal line layer (which is a generic name for any element that is formed from the same conductive film as that of the signal lines and signal lines). Specifically, a leak between an edge portion of a gate electrode and a source electrode or a drain electrode, and a leak between an edge portion of a storage capacitor line and a storage capacitor electrode are likely to occur.

The causes for the aforementioned leaks are that protrusions (called hillocks) are likely to be formed at the edge portions when patterning a conductive film to become the scanning line layer, and that poor coverage is likely to result at the edge portions when forming the gate insulating film above the scanning line layer by CVD technique or the like.

Therefore, when patterning a conductive film to become the scanning line layer, it has been necessary to perform the patterning so that the edge portions become tapered, thus resulting in a deterioration in the processing performance of the patterning step. Moreover, since the edge portions need to be tapered, it has been difficult to form the scanning line layer itself into a thick film.

On the other hand, according to the present embodiment, edges of the gate electrode 14G and edges of the storage capacitor line 20 are covered by the first insulating layer 12*a*, thus making it possible to suppress leak without tapering the edge portions of the scanning line layer (i.e., the gate electrodes 14G and the storage capacitor lines 20). Therefore, the processing performance of the patterning step can be improved. Moreover, since the edge portions do not need to be tapered (i.e., the gate electrodes 14G and the storage capacitor lines 20 are allowed to have side faces which are substantially perpendicular to the substrate plane), the scanning line layer can itself be easily made into a thick film.

Moreover, the surface of the multilayer insulating film 12 facing the signal lines 13 is recessed in each low-stack region 12R. In the present embodiment, as shown in FIG. 6 and FIG. 8(a), the semiconductor layer 17 is formed so as to cover each low-stack region 12R of the multilayer insulating film 12, in such a manner that a portion of the semiconductor layer 17 rides over a region where the first insulating layer 12a is formed. Such a construction makes it possible to ensure electrical connection even when a step-disconnection occurs in a source electrode 14S or a drain electrode 14D. Note that, in order to ensure electrical connection when a step-disconnection occurs, it is only necessary that at least a portion of the semiconductor layer 17 that overlaps the source electrode 14S or the drain electrode 14D rides over a region where the first insulating layer 12a is formed. In order to ensure OFF characteristics of the TFT, it is preferable that, as much as possible, the other portions do not ride over the region where the first insulating layer 12a is formed, as shown in FIG. 6.

Next, an exemplary method for producing the TFT substrate 200a will be described with reference to FIGS. 9(a) to (f).

Figure 9:
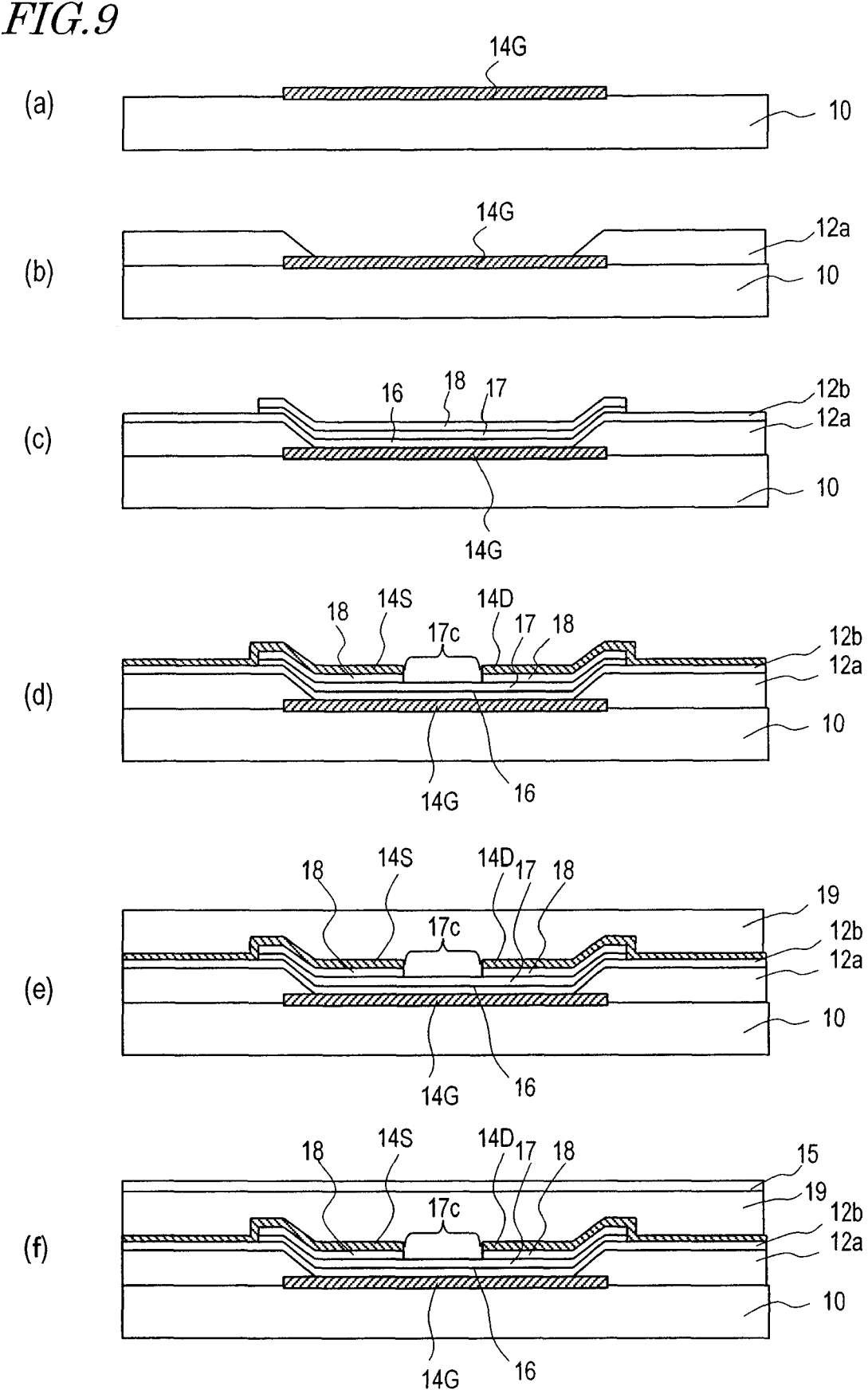

First, on an insulative substrate 10 such as a glass substrate, a conductive film is formed by using sputtering technique, and this conductive film is patterned by using photolithography technique, thus forming a gate electrode 14G as shown in FIG. 9(a). At this time, a scanning line 11 and a storage capacitor line 20 (not shown) are also formed concurrently.

Next, an organic SOG material is applied on the substrate 10 by using spin coating technique, followed by a pre-baking and a post-baking to form the first insulating layer 12a. Thereafter, as shown in FIG. 9(b), by using photolithography technique, predetermined portions of the first insulating layer 12a, namely, a portion overlapping the gate electrode 14G and a portion overlapping the storage capacitor line 20, are removed. However, the removal is performed in such a manner that the first insulating layer 12a is left on the edge portion of the gate electrode 14G and the edge portion of the storage capacitor line 20.

Then, by using CVD technique, an inorganic insulating film, an intrinsic semiconductor film, and an impurity-added semiconductor film are consecutively deposited. Thereafter, the intrinsic semiconductor film and the impurity-added semiconductor film are patterned by using photolithography technique. As a result, as shown in FIG. 9(c), an island-like semiconductor structure is formed which is composed of a second insulating layer 12b (a portion of which functions as a gate insulating film 16), an intrinsic semiconductor layer 17, and an impurity-added semiconductor layer 18.

Thereafter, by sputtering technique, a conductive film is formed, and this conductive film is patterned by photolithography technique, whereby a source electrode 14S, a drain electrode 14D, a signal line 13, and a storage capacitor electrode 12 are formed.

Next, as shown in FIG. 9(d), in a region 17c to become a channel of the island-like semiconductor structure, the impurity-added semiconductor layer 18 is removed by dry etching, using the source electrode 14S and the drain electrode 14D as a mask. Note that, when removing the impurity-added semiconductor layer 18, the surface of the intrinsic semiconductor layer 17 is also slightly etched.

Next, as shown in FIG. 9(e), by using CVD technique, an interlayer insulating film 19 is formed so as to cover essentially the entire surface of the substrate 10. Thereafter, a contact hole 19' is formed by using photolithography technique.

Finally, an ITO film is formed by using sputtering technique, and this ITO film is patterned by using photolithography technique, whereby a pixel electrode 15 is formed as shown in FIG. 9(f). Thus, the TFT substrate 200a is completed.

Figure 10:
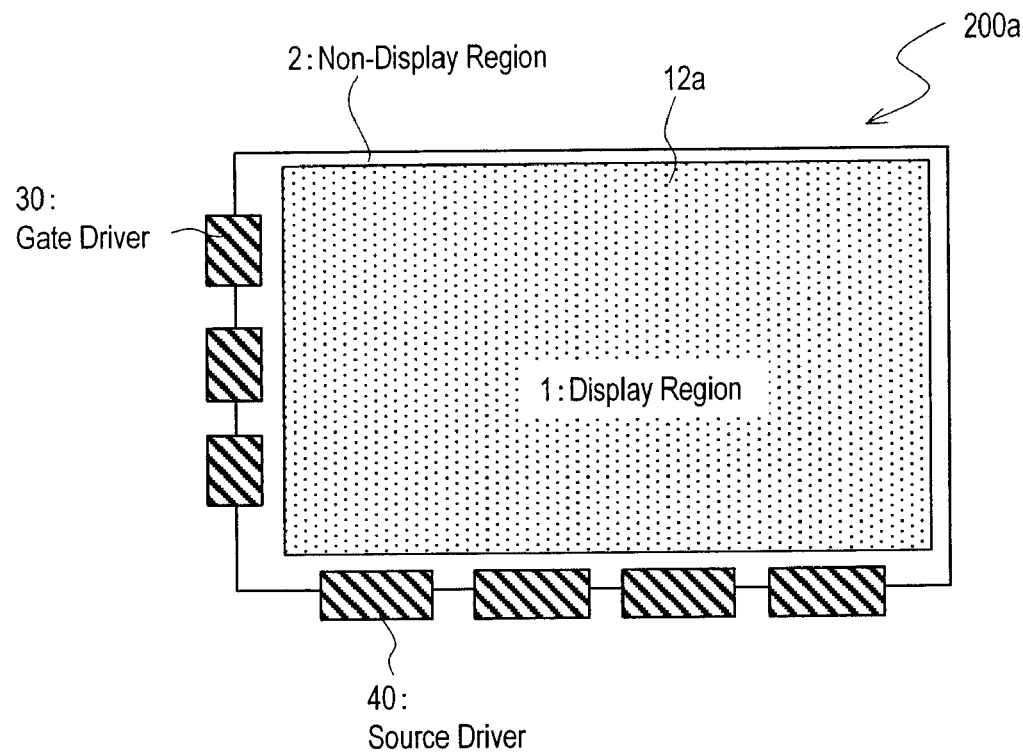

Note that a film which is formed of an organic SOG material is generally susceptible to mechanical stress and thermal stress, and is liable to have cracks. When forming the first insulating layer 12a from an organic SOG material, it is preferable that, from the standpoint of suppressing crack generation, the first insulating layer 12a is not formed in a non-display region 2, i.e., a low-stack region 12R is provided over essentially the entire surface of the non-display region 2, as shown in FIG. 10.

The non-display region 2 is located around the perimeter of a display region 1 which is defined by a plurality of pixel regions arrayed in a matrix, and is also referred to as a frame region. The non-display region 2 includes a plurality of terminals to which signals for driving the pixel regions are input, and gate drivers 30 and source drivers 40 are connected to these terminals. Since stress is likely to be applied to the non-display region 2 during a mounting step and a substrate cutting step, crack generation can be suppressed by not forming the first insulating layer 12a in the non-display region 2.

The aforementioned cracks are more likely to occur as the first insulating layer 12a becomes thicker and the substrate becomes larger in size. Through a detailed study concerning the relationship between crack generation and the material of the first insulating layer 12a, the inventors have found that crack generation can be suppressed by using an SOG material containing a filler which is composed of silica (silica filler), thus making it easy to form a thick first insulating layer 12a in a large-sized active matrix substrate.

Figure 11:
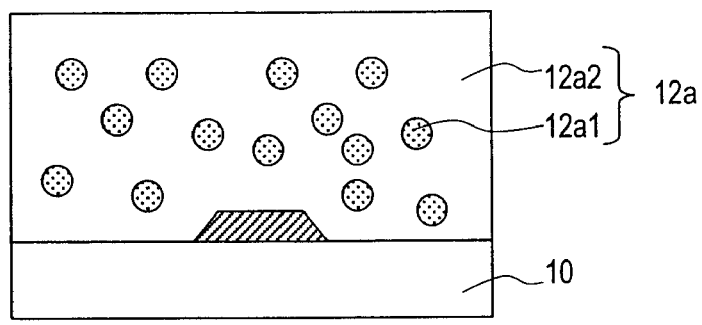
FIG. 11 is a cross-sectional view schematically showing a first insulating layer which is formed of an organic SOG material containing a silica filler.

FIG. 11 schematically shows the cross-sectional structure of a first insulating layer 12a which is formed of an organic SOG material containing a silica filler. As shown in FIG. 11, the first insulating layer 12a has a construction such that a silica filler 12a1 is dispersed in a matrix (base) 12a2 which is formed of an organic SOG material. Such a construction suppresses crack generation because the silica filler 12a1 relieves stress, thus making it easy to form the first insulating layer 12a into a thick film in a large-sized substrate. The silica filler 12a1 typically has a particle size of 10 nm to 30 nm, and the silica filler 12a1 is mixed in the first insulating layer 12a typically at a ratio of 20 volume % to 80 volume %. As an organic SOG material containing a silica filler, LNT-025 manufactured by Catalysts&Chemicals Ind. Co., Ltd. can be used, for example.

Figure 12:
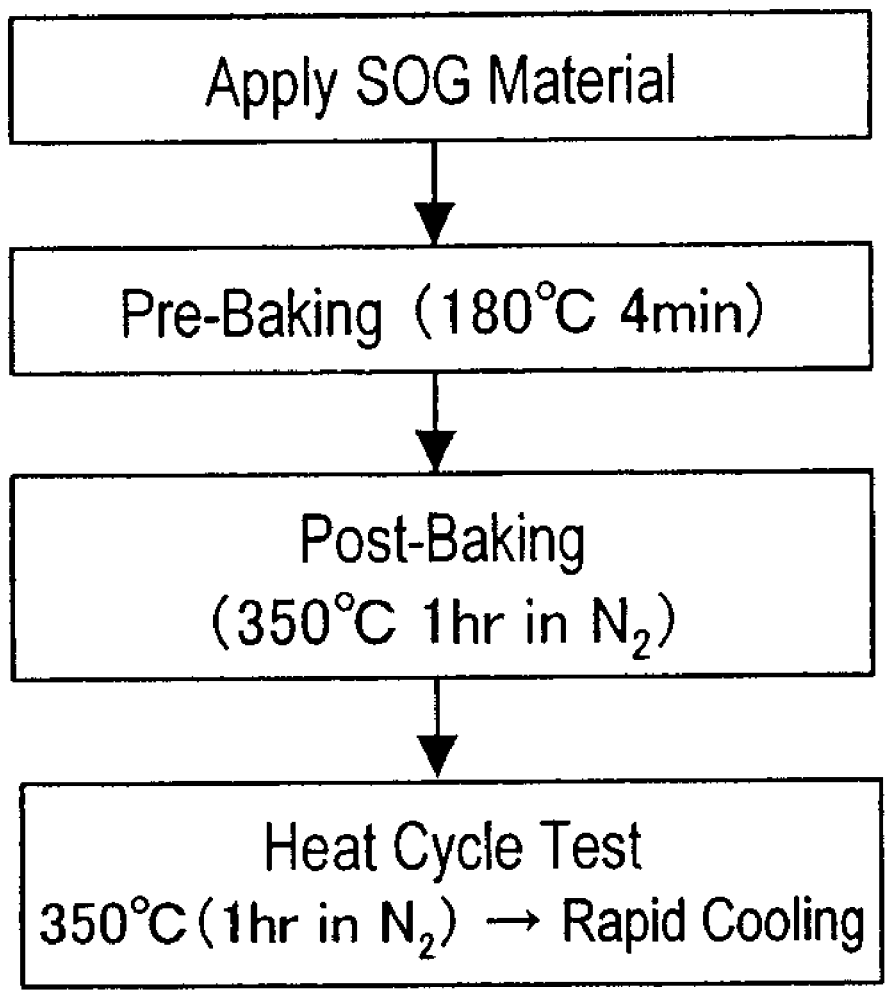
FIG. 12 is a flowchart showing the procedure of an anti-crack property evaluation.

Table 1 shows results of an anti-crack property evaluation regarding an organic SOG film containing a silica filler and an organic SOG film not containing any silica filler. As sample substrates, glass substrates (Corning 1737) sized 360 mm×465 mm were used. The anti-crack property evaluation was performed according to a procedure shown in FIG. 12. Specifically, an SOG material was first applied on the sample substrate, which was then subjected to 4 minutes of pre-baking at 180° C. Then, 1 hour of post-baking was performed at 350° C. under a nitrogen atmosphere to form an SOG film. Thereafter, a heat cycle test was performed where, under an nitrogen atmosphere, the substrate having an SOG film formed thereon was retained at 350° C. for 1 hour and then rapidly cooled.

TABLE 1

| film thickness | without filler | with filler |
| --- | --- | --- |
| 1.0 μm | ○ | ○ |
| 1.5 μm | X | ○ |
| 2.0 μm | X | ○ |
| 2.5 μm | X | ○ |
| 3.0 μm | X | ○ |

As shown in Table 1, in the case where no filler is included, cracks may occur when the film thickness is 1.5 μm or greater. On the other hand, in the case where a filler is included, crack generation is successfully suppressed even when the film thickness is 3.0 μm.

Embodiment 3

FIG. 13 and FIGS. 14(a) to (d) schematically show a liquid crystal display device 300 according to the present embodiment.

As shown in FIG. 13 and FIGS. 14(a) to (c), the TFT substrate 300a of the liquid crystal display device 300 of the present embodiment has essentially the same construction as that of the TFT substrate 200a of the liquid crystal display device 200 of Embodiment 2.

Figure 13:
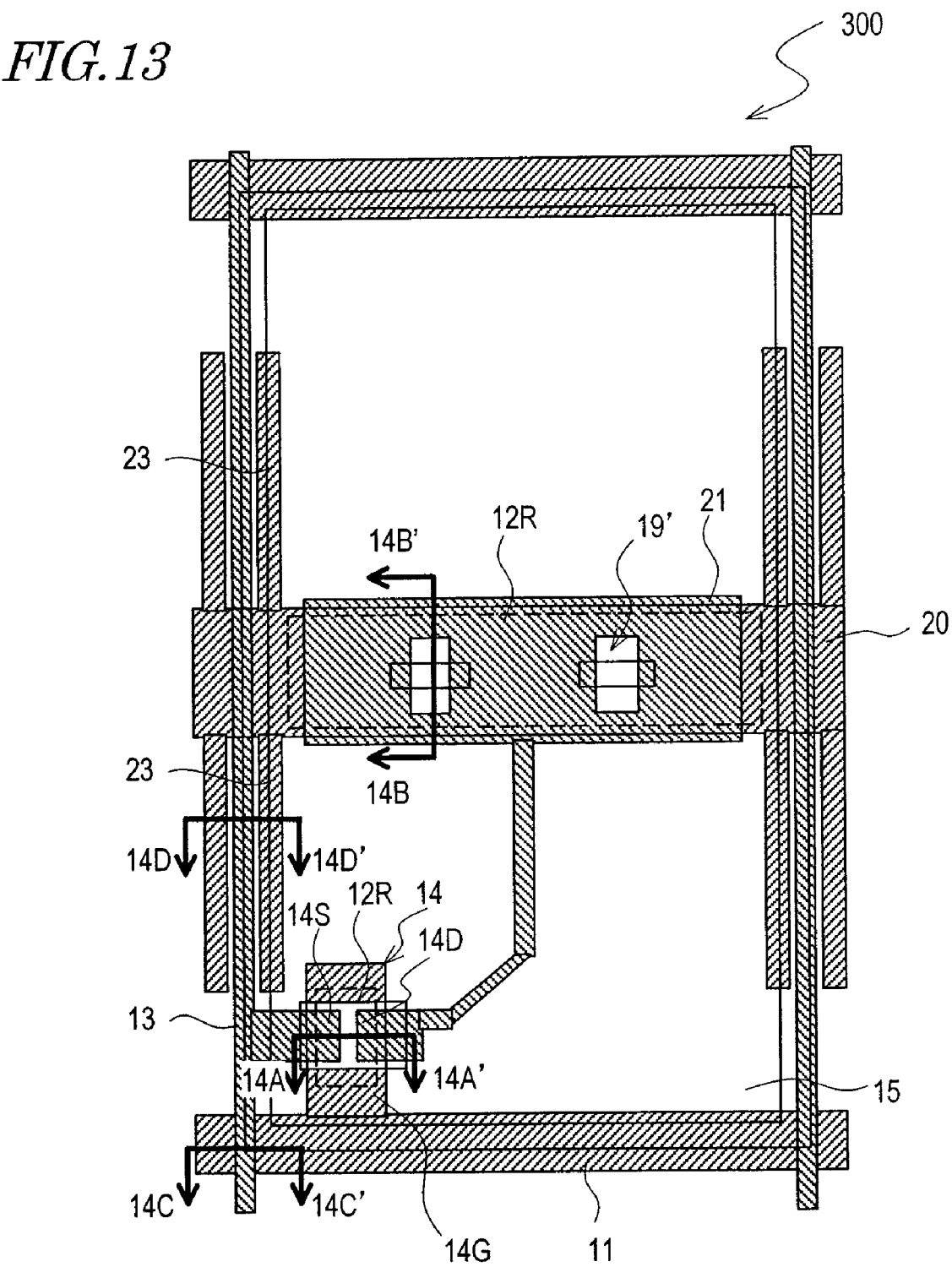
FIG. 13 is an upper plan view schematically showing a liquid crystal display device 300 according to a third embodiment of the present invention.
Figure 14:
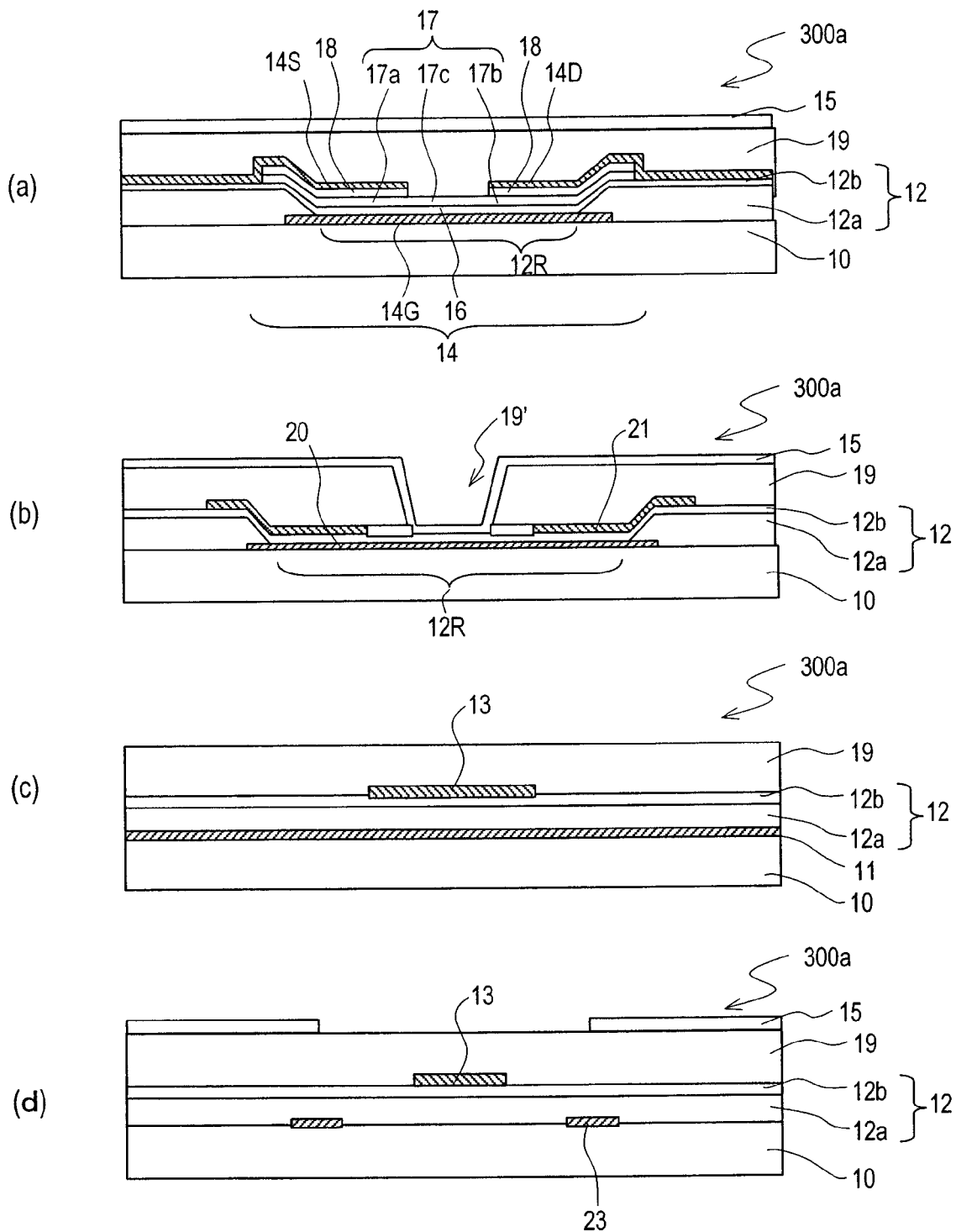
FIGS. 14(a) to (d) are cross-sectional views schematically showing a TFT substrate 300a of the liquid crystal display device 300, each showing a cross section taken along line 14A-14A', line 14B-14B', line 14C-14C', or line 14D-14D' in FIG. 13, respectively.

However, as shown in FIG. 13 and FIG. 14(d), the TFT substrate 300a of the liquid crystal display device 300 differs from the TFT substrate 200a of the liquid crystal display device 200 in that a plurality of shield electrodes 23 extending substantially in parallel to the signal lines 13 are comprised.

The shield electrodes 23 of the present embodiment are formed by patterning the same conductive film as that of the scanning lines 11. Each shield electrode 23 is connected to a storage capacitor line 20, and receives a constant potential. Hereinafter, a problem which may occur when the shield electrodes 23 are not provided and an advantage which is obtained by providing the shield electrodes 23 will be described.

When the shield electrodes 23 are not present, a capacitance will be formed between the pixel electrode 15 and the signal line 13. In other words, when looking at the electric lines of force within each pixel region, the electric lines of force will not only be formed so as to connect the pixel electrode 15 and the counter electrode, but also to connect the pixel electrode 15 and the signal line 13. Therefore, the potential of the pixel electrode 15, which should be maintained constant throughout one frame, may fluctuate under the influence of the potential of the signal line 13.

On the other hand, when the shield electrodes 23 are provided, the electric line of forces from the pixel electrode 15 toward the signal line 13 can be guided to each shield electrode 23, thus preventing a capacitance from being formed between the pixel electrode 15 and the signal line 13. As a result, fluctuations of the potential of the pixel electrode 15, as may occur under the influence of the potential of the signal line 13, can be suppressed. In other words, the shield electrodes 23 have the function of shielding the pixel electrodes 15 from the electric fields which are generated by the signal lines 13.

From the standpoint of guiding as many electric lines of force from the pixel electrode 15 to each shield electrode 23 as possible and effectively suppressing fluctuations of the potential of the pixel electrode 15, it is preferable that, as shown in FIG. 14(d), the shield electrode 23 is located at a position which is closer to the signal line 13 than is the edge portion of the pixel electrode 15. Moreover, since the region between the signal line 13 and the pixel electrode 15 is a region where leakage of light may occur in the case of a liquid crystal display device, it is preferable to shield this region from light by providing a light shield (also called a black matrix) on the counter substrate side. However, providing the shield electrode 23 so as to overlap an edge of the pixel electrode 15 as shown in FIG. 14(d) makes it possible to reduce the width of the light shield on the counter substrate side, whereby the aperture ratio and transmittance of the liquid crystal display device are improved.

FIG. 15 and FIGS. 16(a) to (d) show another liquid crystal display device 300' according to the present embodiment. The TFT substrate 300a' of the liquid crystal display device 300' differs from the TFT substrate 300a of the liquid crystal display device 300 with respect to the location of the low-stack regions 12R of the multilayer insulating film 12.

Figure 15:
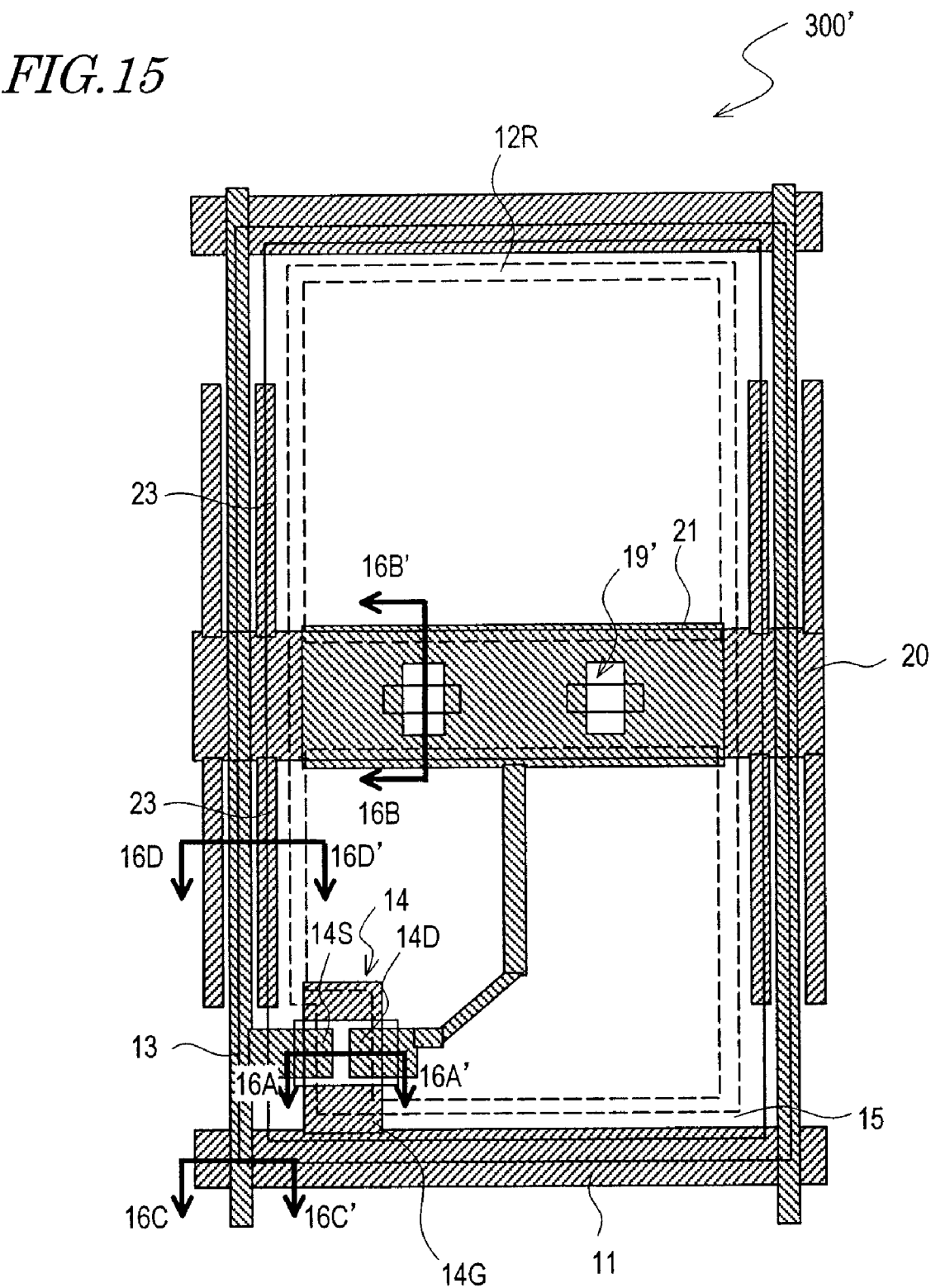
FIG. 15 is an upper plan view schematically showing another liquid crystal display device 300' according to a third embodiment of the present invention.
Figure 16:
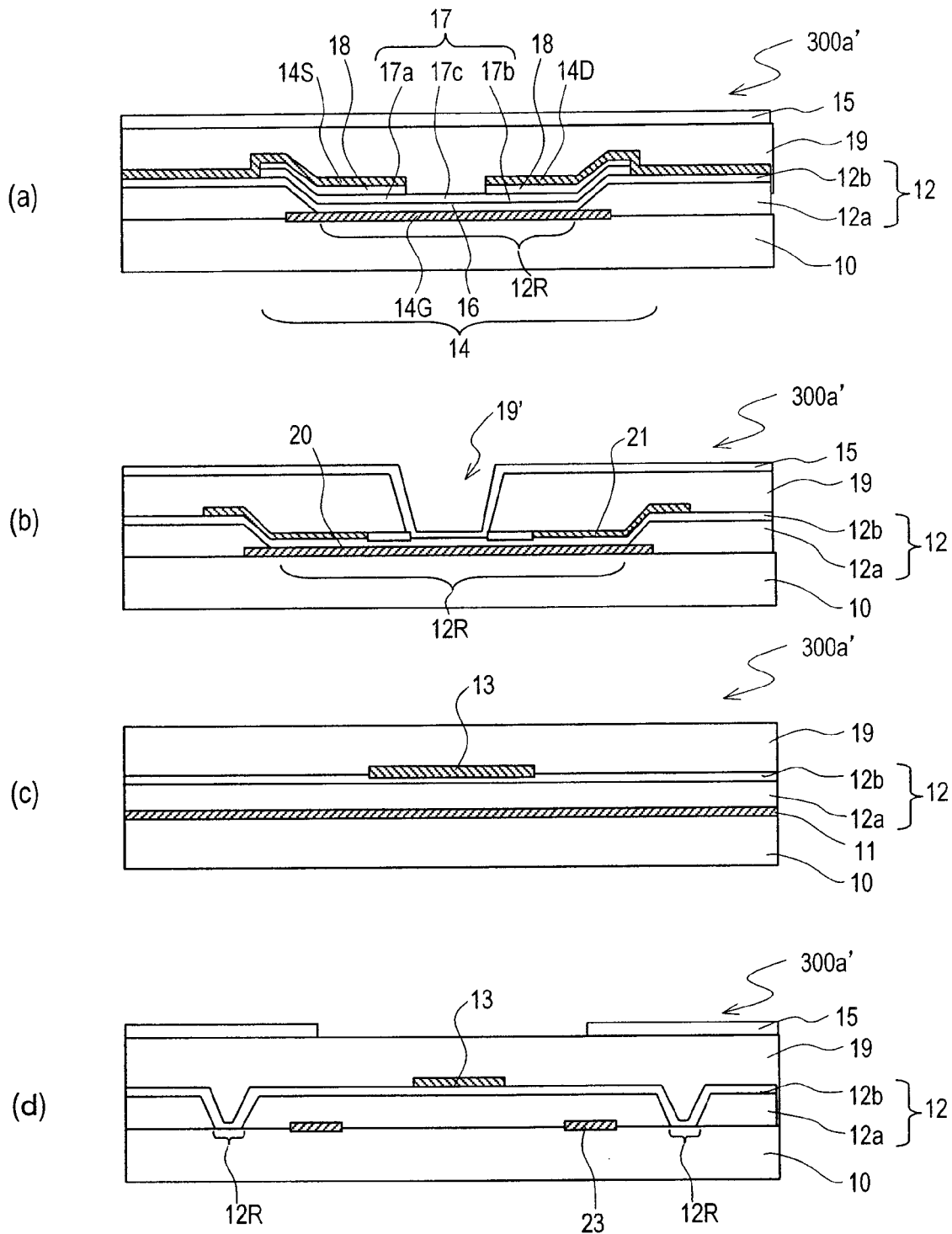
FIGS. 16(a) to (d) are cross-sectional views schematically showing a TFT substrate 300a' of the liquid crystal display device 300', each showing a cross section taken along line 16A-16A', line 16B-16B', line 16C-16C', or line 16D-16D' in FIG. 15, respectively.

As shown in FIGS. 16(a) and (b), in the TFT substrate 300a', low-stack regions 12R are formed in portions overlapping the channel regions 17c and in between storage capacitor lines 20 and storage capacitor electrodes 21. In addition, as shown in FIG. 15 and FIG. 16(d), a low-stack region 12R is formed so as to extend along the outer periphery of each pixel region. In other words, the multilayer insulating film 12 of the TFT substrate 300a' has an annular low-stack region 12R near the outer periphery of each pixel region.

Such a construction allows the first insulating layer 12a to be split into pixel regions by trenches (low-stack regions 12R), so that cracks due to thermal stress are less likely to occur in the case of a large-sized substrate.

Embodiment 4

FIG. 17 and FIGS. 18(a) to (d) schematically show a liquid crystal display device 400 according to the present embodiment.

As shown in FIG. 17 and FIGS. 18(a) to (c), the TFT substrate 400a of the liquid crystal display device 400 of the present embodiment has essentially the same construction as that of the TFT substrate 300a of the liquid crystal display device 300 of Embodiment 3.

Figure 17:
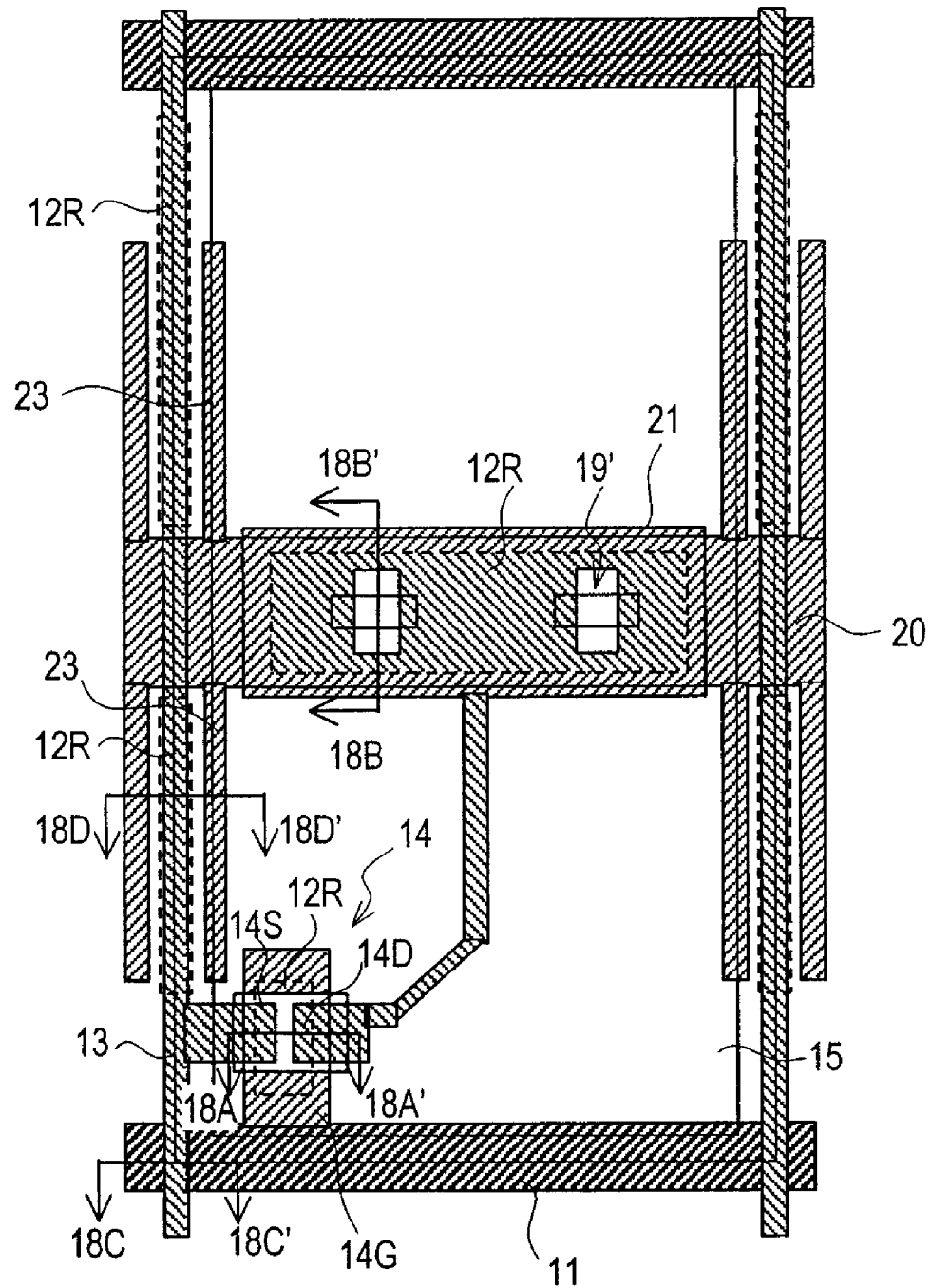
FIG. 17 is an upper plan view schematically showing a liquid crystal display device 400 according to a fourth embodiment of the present invention.
Figure 18:
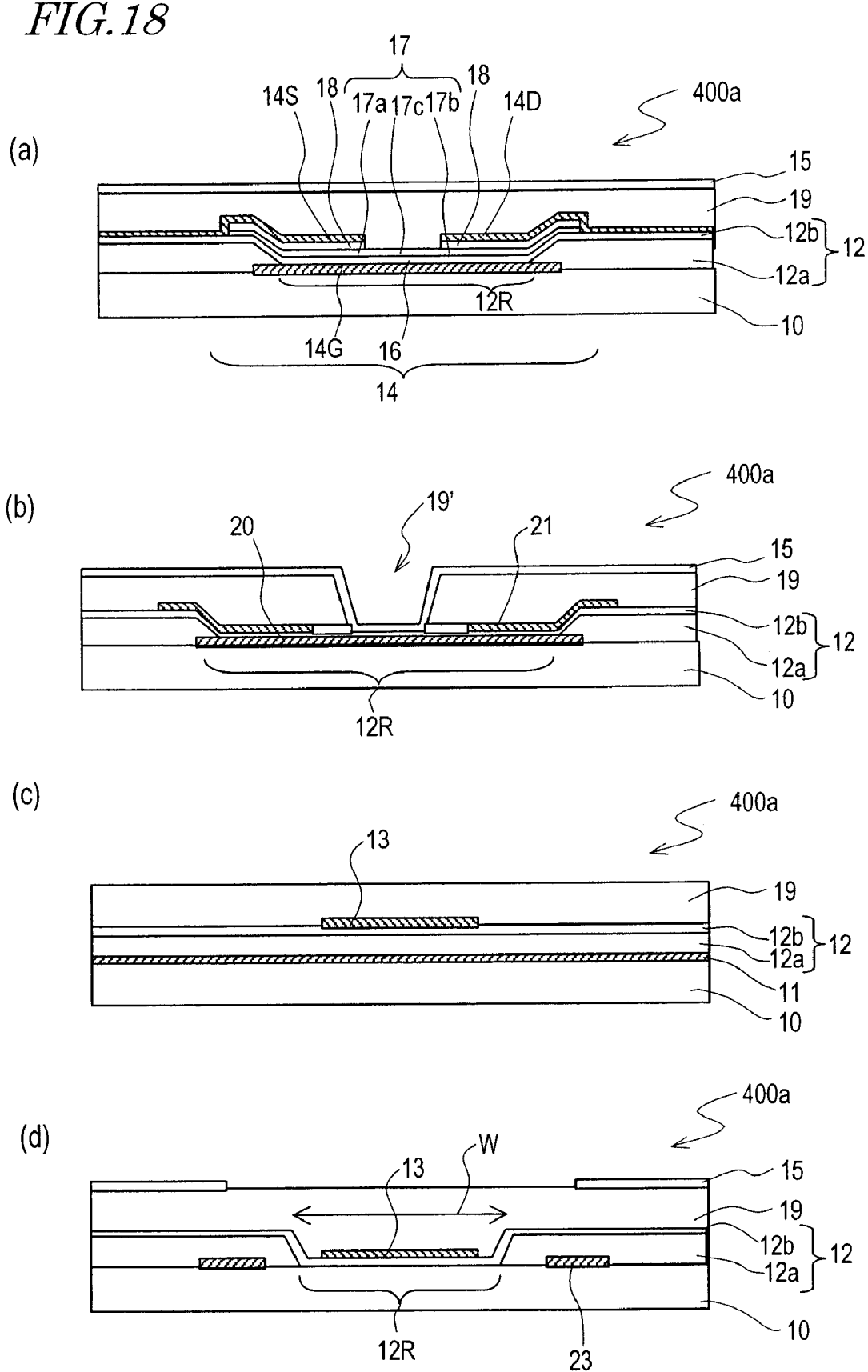
FIGS. 18(a) to (d) are cross-sectional views schematically showing a TFT substrate 400a of the liquid crystal display device 400, each showing a cross section taken along line 18A-18A', line 18B-18B', line 18C-18C', or line 18D-18D' in FIG. 17, respectively.

However, as shown in FIG. 17 and FIG. 18(d), the TFT substrate 400a of the liquid crystal display device 400 differs from the TFT substrate 300a of the liquid crystal display device 300 in that low-stack regions 12R of the multilayer insulating film 12 are located so as also to overlap portions of the signal lines 13.

The multilayer insulating film 12 of the present embodiment has low-stack regions 12R (where the first insulating layer 12a is not formed) in portions overlapping the channel regions 17 of the TFTs 14 and in between storage capacitor lines 20 and storage capacitor electrodes 21, as shown in FIG. 17 and FIGS. 18(a) and (b), and further in portions of the regions overlapping the signal lines 13, as shown in FIG. 17 and FIG. 18(d). The first insulating layer 12a in the low-stack regions 12R overlapping portions of the signal lines 13 are removed in slit shapes in a step of patterning the first insulating layer 12a.

When the low-stack regions 12R are located so as to overlap portions of the signal lines 13, as can be seen from a comparison between FIG. 14(d) and FIG. 18(d), the distance between each signal line 13 and each pixel electrode 15 and the distance between each signal line 13 and the counter electrode 51 can be made longer. As a result, the capacitance which is formed between each signal line 13 and each pixel electrode 15 and the capacitance which is formed between each signal line 13 and the counter electrode 51 can be reduced.

As described above, the low-stack regions 12R of the multilayer insulating film 12 are located so as to overlap portions of the signal lines 13. Note however that, as shown in FIG. 17 and FIG. 18(c), the low-stack regions 12R are not located at any intersection between a signal line 13 and a scanning line 11 or at any intersection between a signal line 13 and a storage capacitor line 20. Thus, the capacitance which is formed between each signal line 13 and each scanning line 11 and the capacitance which is formed between each signal line 13 and each storage capacitor line 20 are reduced, as is case with the liquid crystal display device 300d of Embodiment 3.

The interlayer insulating film 19 covering the TFTs 14 and the signal lines 13 is preferably formed of an application-type material (e.g., an acrylic resin or an organic SOG material). By forming the interlayer insulating film 19 from an application-type material, it becomes possible to even out the level differences associated with the low-stack regions 12R being provided in the multilayer insulating film 12, and thus prevent a decrease in the contrast ratio due to such level differences.

In the present embodiment, as shown in FIG. 17, slit-like low-stack regions 12R are provided so as to overlap portions of the signal lines 13. According to a study by the inventors, the planarization effect by the interlayer insulating film 19 was further enhanced by prescribing a width W (width along a direction perpendicular to the longitudinal direction) of each slit-like low-stack region 12R to 30 μm or less. If the width of each low-stack region 12R exceeds 30 μm, the dents which are formed in the surface of the interlayer insulating film 19 may become so large as to cause a decrease in the contrast ratio.

The scanning lines 13 and the storage capacitor lines 20 illustrated in Embodiment 1 include an Mo film in their uppermost layer. However, the inventors have conducted a detailed evaluation of the degree of contact between the scanning lines 13/storage capacitor lines 20 and the first insulating layer (which is preferably formed of an organic SOG material) 12a, to find that the scanning lines 13 and the storage capacitor lines 20 should preferably include a wiring layer composed of titanium (Ti) or titanium nitride (TiN) at the insulating film 12 side (e.g., as an uppermost layer in the case of a multilayer wiring line). Table 2 shows evaluation results, in a peeling test, of the degree of contact between the scanning line 13/storage capacitor line 20 and the first insulating layer 12a. In Table 2, "○" indicates that no peeling of the first insulating layer 12a has occurred, whereas "Δ" indicates that peeling of the first insulating layer 12a has occurred depending on the pattern of the wiring lines.

TABLE 2

| | material of uppermost layer | | | |
| --- | --- | --- | --- | --- |
| | Mo | MoN | Ti | TiN |
| film thickness: 0.5 μm | ○ | ○ or Δ | ○ | ○ |
| film thickness: 1.0 μm | ○ | Δ | ○ | ○ |

As can be seen from Table 2, in the case where an Mo-type film was used for the uppermost layer, the degree of contact was not sufficient under some conditions. On the other hand, when a Ti-type film (a film composed of Ti or TiN) was used for the uppermost layer, a sufficient degree of contact was obtained regardless of the conditions, thus improving the stability of the production process.

Embodiment 5

FIG. 19 and FIGS. 20(a) to (d) schematically show a liquid crystal display device 500 according to the present embodiment.

As shown in FIG. 19 and FIGS. 20(a) to (c), a TFT substrate 500a of the liquid crystal display device 500 of the present embodiment has essentially the same construction as that of the liquid crystal display device 400 of the TFT substrate 400a of Embodiment 4.

Figure 19:
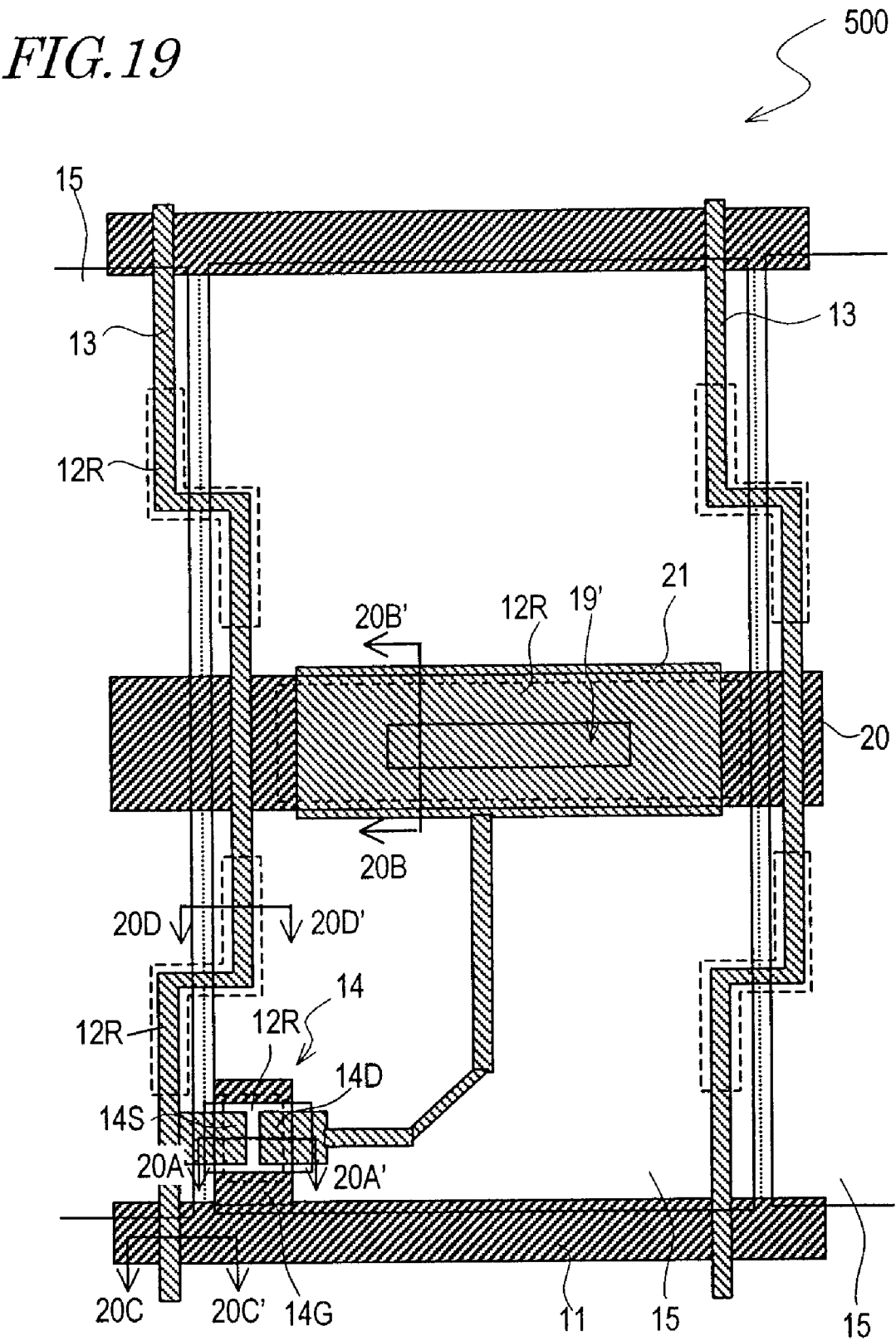
FIG. 19 is an upper plan view schematically showing a liquid crystal display device 500 according to a fifth embodiment of the present invention.
Figure 20:
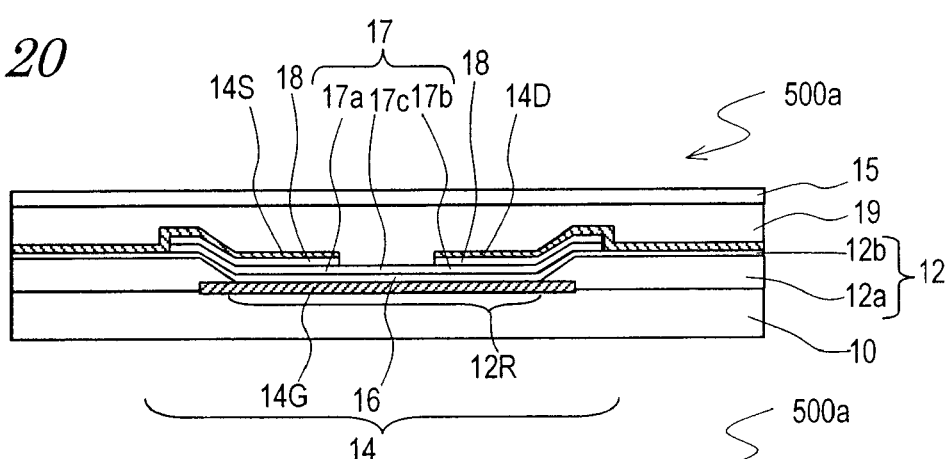
FIGS. 20(a) to (d) are cross-sectional views schematically showing a TFT substrate 500a of the liquid crystal display device 500, each showing a cross section taken along line 20A-20A', line 20B-20B', line 20C-20C', or line 20D-20D' in FIG. 19, respectively.
Figure 20:
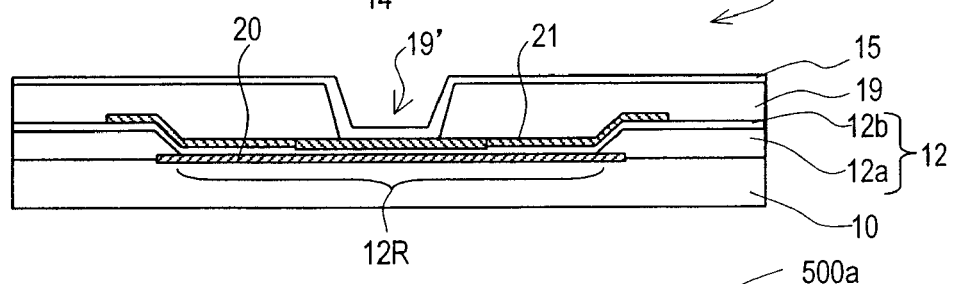
Figure 20:
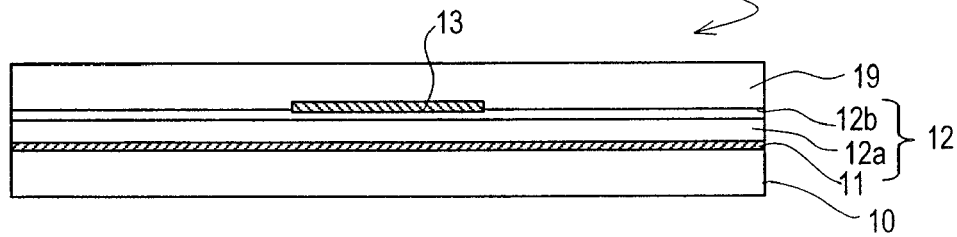
Figure 20:
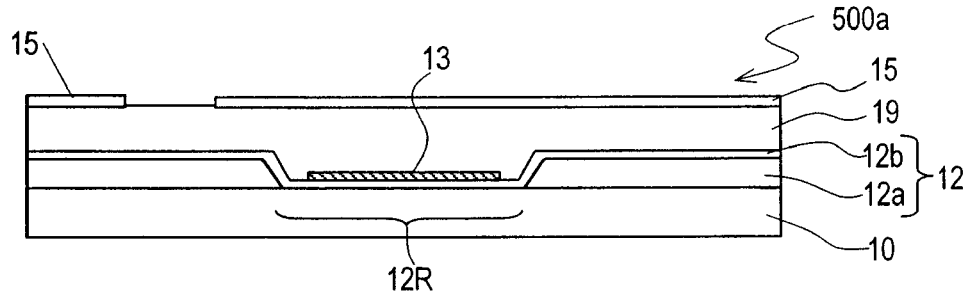

However, as shown in FIG. 19 and FIG. 20(d), the TFT substrate 500a of the liquid crystal display device 500 differs from the TFT substrate 400a of the liquid crystal display device 400 in that the signal lines 13 are bent and that no shield electrodes 23 are included.

As shown in FIG. 19, the signal lines 13 of the present embodiment are bent in the form of rectangular waves, so that the pixel electrode 15 of each pixel region overlaps both of its two adjoining signal lines 13 via the interlayer insulating film 19.

For example, when looking at the pixel electrode 15 shown in the center of FIG. 19, the pixel electrode 15 overlaps both the left-hand side signal line 13 which is electrically connected thereto via the TFT 14, and the right-hand side signal line 13 which is not electrically connected thereto. Moreover, the two signal lines 13 are bent in such a manner that a capacitance $Csd_1$ which is formed between one of the signal lines 13 and the pixel electrode 15 and a capacitance $Csd_2$ which is formed between the other signal line 13 and the pixel electrode 15 are essentially equal to each other.

Thus, in the present embodiment, the capacitance $Csd_1$ and the capacitance $Csd_2$ are essentially equal in each pixel region. Therefore, without providing shield electrodes 23 as shown in FIG. 17, fluctuations of the potential of the pixel electrode 15 (fluctuations under the influence of the potentials of the signal lines 13) can be suppressed. As a result, the aperture ratio can be improved. Hereinafter, the reason why fluctuations of the potential of the pixel electrode 15 can be suppressed by ensuring that the capacitance $Csd_1$ and the capacitance $Csd_2$ are equal will be described.

As driving methods for an active matrix type liquid crystal display device, one-line inversion driving, which inverts the polarity of a signal voltage each time one line is scanned, and dot inversion driving, which inverts the polarity of a signal voltage for each adjacent pixel, are known. The amount of fluctuations in the potential of a pixel electrode that are caused by a capacitance which is formed between the pixel electrode and a signal line is essentially in proportion with a sum of the capacitance $Csd_1$ and the capacitance $Csd_2$ in the case of using one-line inversion driving, and essentially in proportion with a difference between the capacitance $Csd_1$ and the capacitance $Csd_2$ in the case of using dot inversion driving. Therefore, the fluctuations of the potentials of the pixel electrodes can be suppressed by using dot inversion driving. In the present embodiment, furthermore, the signal lines 13 are bent so that the capacitance $Csd_1$ and the capacitance $Csd_2$ are essentially equal, and therefore the fluctuations of the potentials of the pixel electrodes 15 can be further suppressed.

Figure 21:
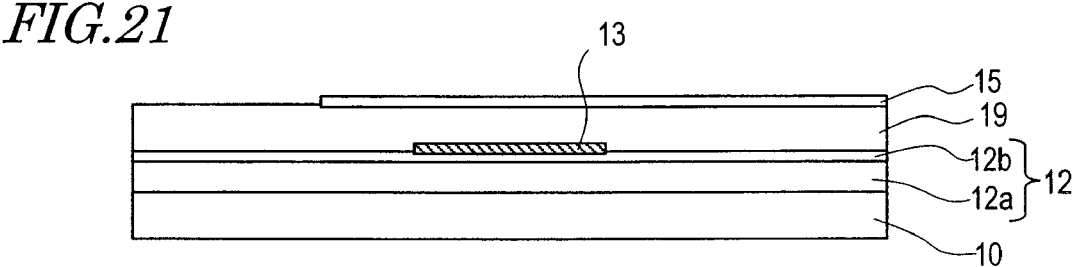
FIG. 21 is a view showing a cross-sectional structure in the case where a multilayer insulating film does not have a low-stack region which overlaps signal lines, the view corresponding to FIG. 20(d).

In the present embodiment, since the signal lines 13 overlap the pixel electrodes 15, the capacitance which is formed between each signal line 13 and each pixel electrode 15 is greater than in the case where the signal lines 13 do not overlap the pixel electrodes 15. However, in the present embodiment, as shown in FIG. 19 and FIG. 20(d), low-stack regions 12R of the multilayer insulating film 12 are provided so as to overlap portions of the signal lines 13 (i.e., portions not overlapping the scanning lines 11 or the storage capacitor lines 20). Therefore, increase in the capacitance can be suppressed as compared to the case where, as shown in FIG. 21, no low-stack regions that overlap the signal lines 13 are provided.

Figure 22:
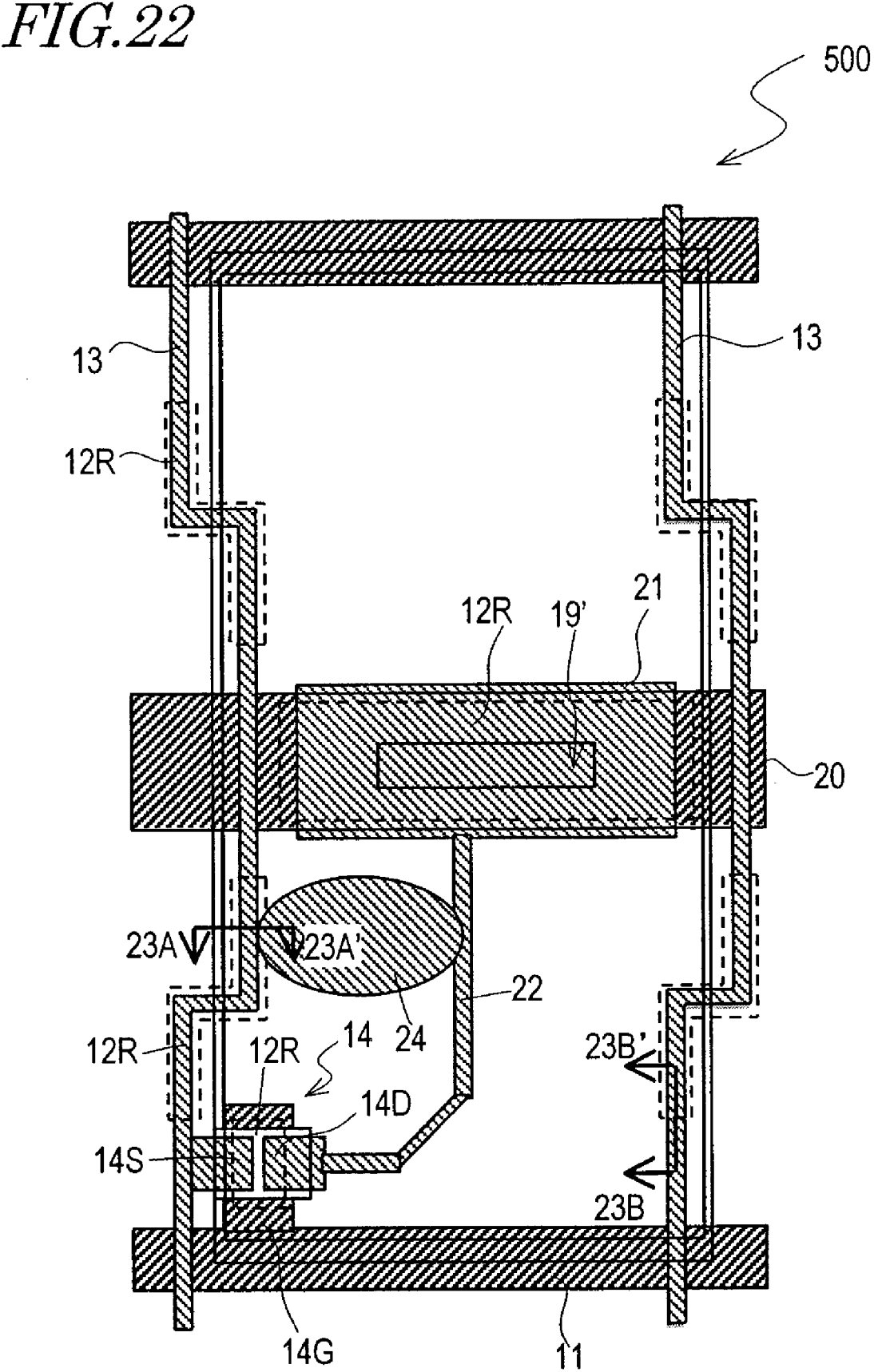
FIG. 22 is an upper plan view schematically showing a liquid crystal display device 500.
Figure 23:
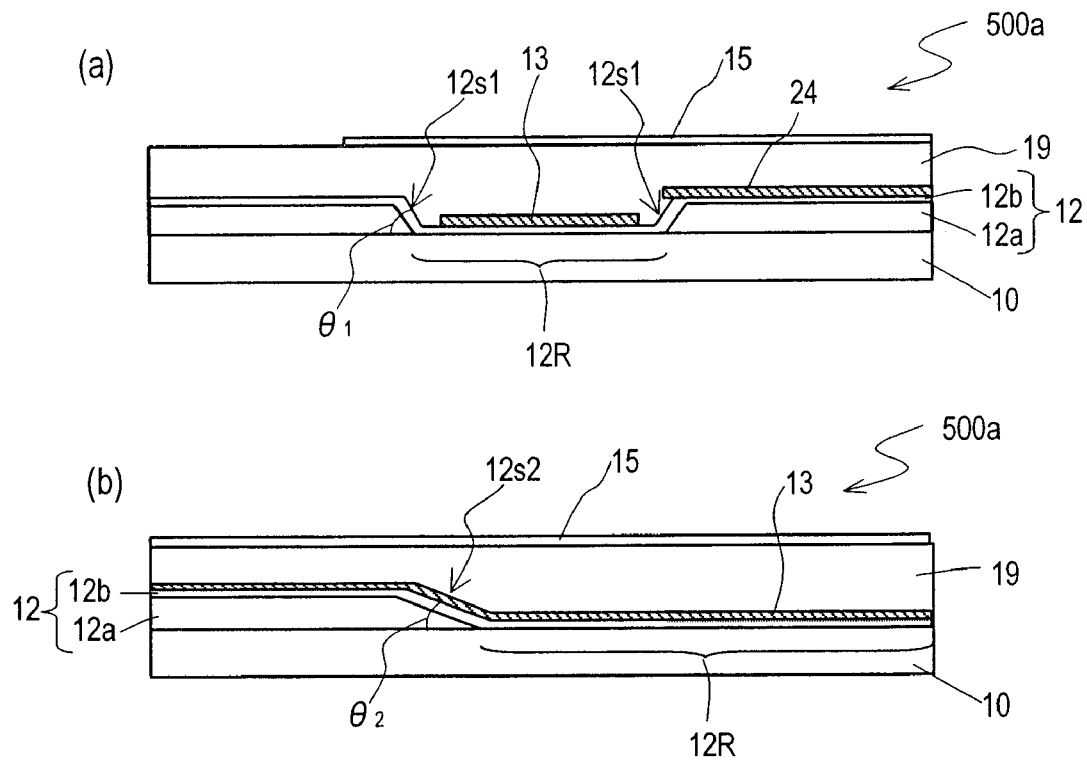
FIGS. 23(a) and (b) are views for explaining preferable tilt angles for slopes of a multilayer insulating film, each showing a cross section taken along line 23A-23A' or line 23B-23B' in FIG. 22, respectively.

Moreover, in the case where low-stack regions 12R are provided in the multilayer insulating film 12, the surface of the multilayer insulating film 12 facing the liquid crystal layer 60 includes not only a plane which is parallel to a principal face of the substrate but also slopes which are tilted with respect to the principal face of the substrate, and each low-stack region 12R is surrounded by the slopes of the multilayer insulating film 12. Now, preferable tilt angles of the slopes of the multilayer insulating film 12 will be described with reference to FIG. 22 and FIGS. 23(a) and (b). FIG. 23(a) is a cross-sectional view taken along line 23A-23A' in FIG. 22, showing a cross section which is orthogonal to the direction in which the signal lines 13 extend. FIG. 23(b) is a cross-sectional view taken along line 23B-23B' in FIG. 22, showing a cross section which is parallel to the direction in which the signal lines 13 extend.

The slopes of the multilayer insulating film 12 include portions which are parallel to the direction in which the signal lines 13 extend (hereinafter referred to as "first portions") 12s1 as shown in FIG. 23(a), and portions which are substantially orthogonal to the direction in which the signal lines 13 extend (hereinafter referred to as "second portions") 12s2, as shown in FIG. 23(b).

As shown in FIGS. 23(a) and (b), a tilt angle $\theta_1$ of each first portion 12s1 with respect to the principal face of the substrate 10 is preferably greater than a tilt angle $\theta_2$ of each second portion 12s2 with respect to the principal face of the substrate 10. The reasons are as follows.

In the production steps of the TFT substrate 500a, when a conductive film is patterned, a portion to be removed may sometimes remain unremoved (called a pattern failure). Such a pattern failure may cause short-circuiting between wiring lines, thus causing an electric current leak. For example, FIG. 22 shows a conductive piece 24 which was left unremoved when patterning a conductive film to become a signal line 13. If such a conductive piece 24 short-circuits the signal line 13 to another element (e.g., a conductive member 22 which extends from the drain electrode 14D), an electric current leak may occur.

Figure 24:
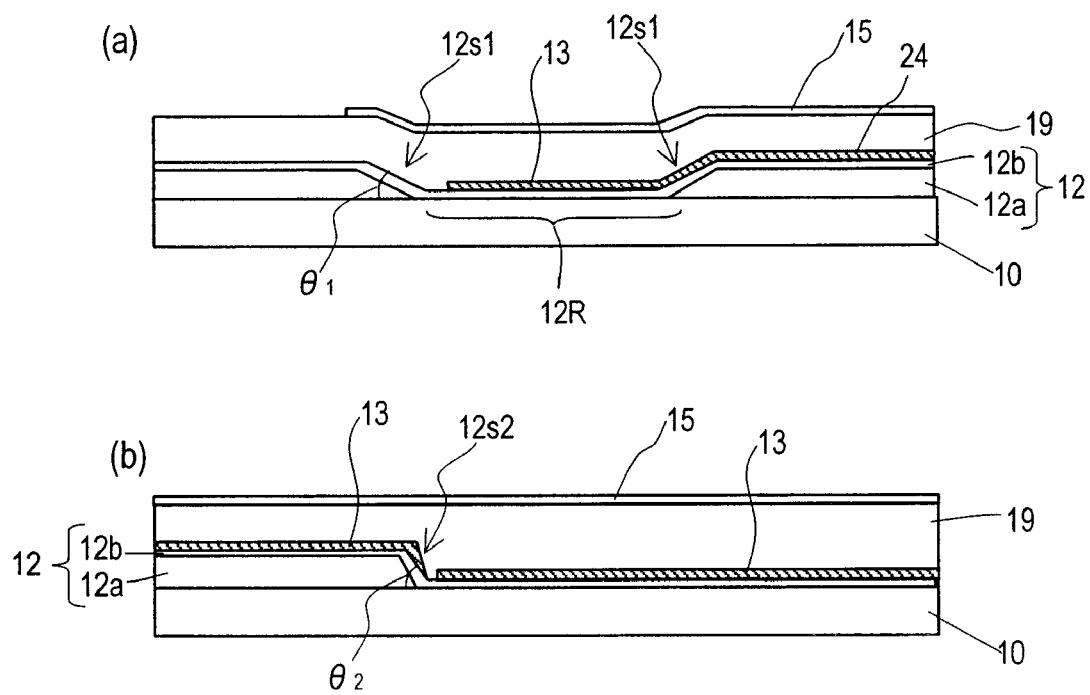
FIG. 24(a) is a view schematically showing how a conductive piece which is formed via a pattern failure is connected to a signal line; and (b) is a view schematically showing how a breaking of a signal line may occur.

The greater the tilt angle $\theta_1$ of each first portion 12s1 is, the more likely the conductive piece 24 which has been formed due to a pattern failure is to break at the first portion 12s1 as shown in FIG. 23(a), thus being unlikely to be connected to the signal line 13. On the other hand, the smaller the tilt angle $\theta_1$ of each first portion 12s1 is, the more likely the conductive piece 24 is to be connected to the signal line 13 as shown in FIG. 24(a), thus causing a leak.

Moreover, when low-stack regions 12R are provided so as to overlap portions of the signal lines 13 as in the present embodiment, breaking of a signal line 13 may occur at a level difference near a low-stack region 12R.

The smaller the tilt angle $\theta_2$ of each second portion 12s2 is, the less likely the signal line 13 is to break at the second portion 12s2, as shown in FIG. 23(b). On the other hand, the greater the tilt angle $\theta_2$ of each second portion 12s2 is, the more likely the signal line 13 is to break at the second portion 12s2 as shown in FIG. 24(b).

As mentioned above, the greater the tilt angle $\theta_1$ of the first portions 12s1 is, the less likely leaks due to pattern failures are to occur, and the smaller the tilt angle $\theta_2$ of the second portions 12s2 is, the less likely the signal lines 13 are to break. Therefore, by prescribing the tilt angle $\theta_1$ of the first portions 12s1 to be greater than the tilt angle $\theta_2$ of the second portions 12s2, it becomes possible to suppress leaks due to pattern failures, while also suppressing breaking of the signal lines 13.

In order to suppress leaks due to pattern failures, it is preferable that the tilt angle $\theta_1$ of the first portions 12s1 is 60° or more. In order to suppress breaking of the signal lines 13, it is preferable that the tilt angle $\theta_2$ of the second portions 12s2 is 40° or less.

If the tilt angle $\theta_1$ of the first portion 12s1 is small, it is difficult to obtain a planarization effect with the interlayer insulating film 19, and the interlayer insulating film 19 above the signal lines 13 becomes thin, as shown in FIG. 24(a). This detracts from the effect provided by the interlayer insulating film's 19 of reducing the capacitance which is formed between each signal line 13 and the counter electrode 51. By prescribing a large tilt angle $\theta_1$ for the first portions 12s1, it becomes easier to obtain a planarization effect with the interlayer insulating film 19, so that the interlayer insulating film 19 above the signal line 13 is less likely to become thin as shown in FIG. 23(a). Therefore, the capacitance which is formed between each signal line 13 and the counter electrode 51 can be sufficiently reduced.

Figure 25:
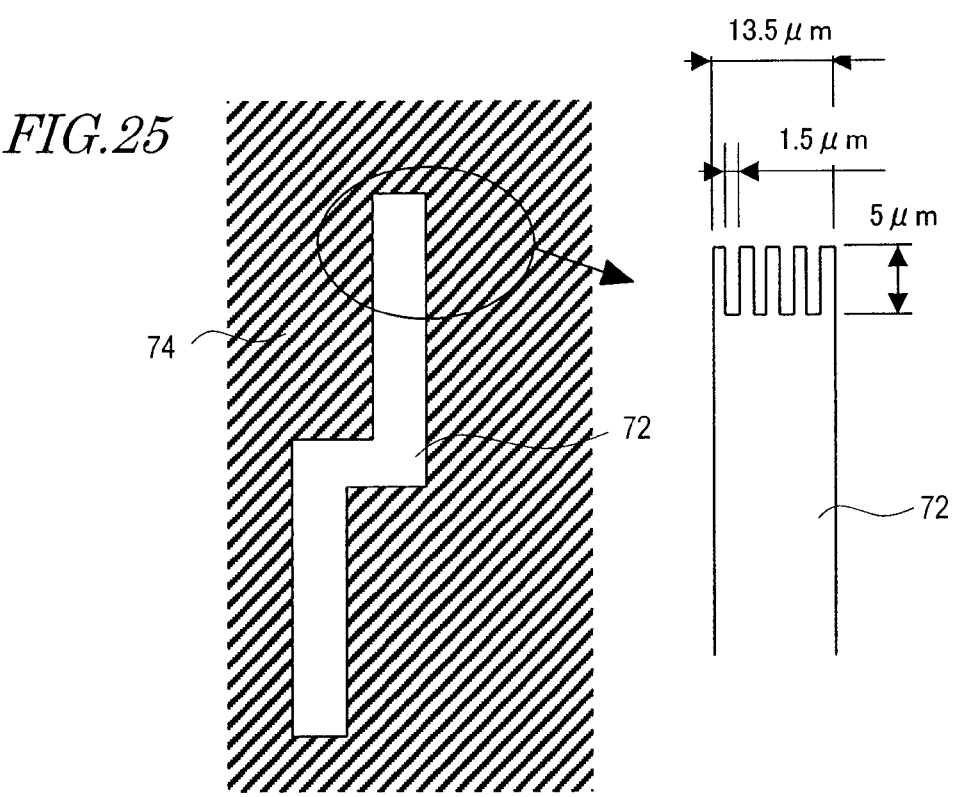
FIG. 25 is a diagram showing an exemplary mask pattern for controlling a tilt angle of a slope of a multilayer insulating film.
Figure 26:
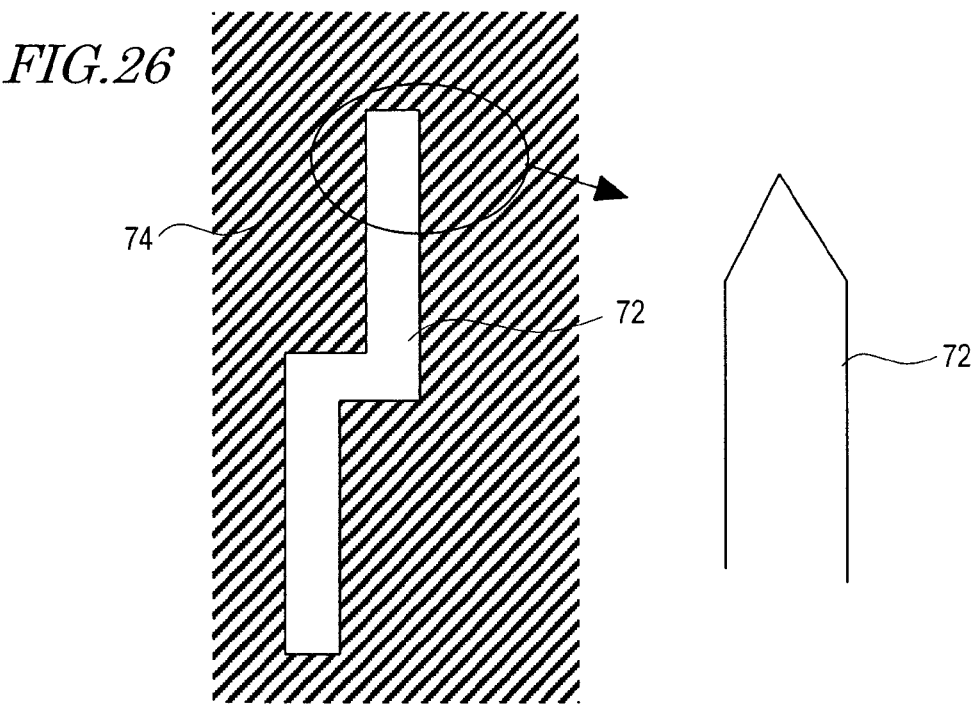
FIG. 26 is a diagram showing another exemplary mask pattern for controlling a tilt angle of a slope of a multilayer insulating film.

A difference between the tilt angle $\theta_1$ of the first portion 12s1 and the tilt angle $\theta_2$ of the second portions 12s2 can be introduced by adopting a mask pattern which is shown in FIG. 25 or FIG. 26, for example. FIG. 25 and FIG. 26 are diagrams showing patterns for a photomask to be used when patterning the first insulating layer 12a by photolithography technique.

The mask patterns shown in FIG. 25 and FIG. 26 are composed of a light-transmitting portion 72 corresponding to a region where the first insulating layer 12a is to be removed, i.e., a low-stack region 12R, and a light-shielding portion 74 corresponding to a region where the first insulating layer 12a is to be left intact. As will be appreciated, it is also possible to use a mask pattern which is composed of a light-shielding portion corresponding to a region where the first insulating layer 12a is to be removed and a light-transmitting portion corresponding to a region where the first insulating layer 12a is to be left intact. Either construction may be used depending on whether the photoresist used is a positive type or a negative type.

In the mask pattern shown in FIG. 25, an end of the light-transmitting portion 72 is in the form of combteeth, as is shown enlarged in FIG. 25. For example, for a light-transmitting portion 72 having a width of 13.5 μm, combteeth having a length of 5 μm and a width of 1.5 μm may be provided at an interval of 1.5 μm. In the mask pattern shown in FIG. 26, as is shown enlarged in FIG. 26, an end of the light-transmitting portion 72 is formed so as to become narrower in width (i.e., pointed) toward the end.

Figure 27:
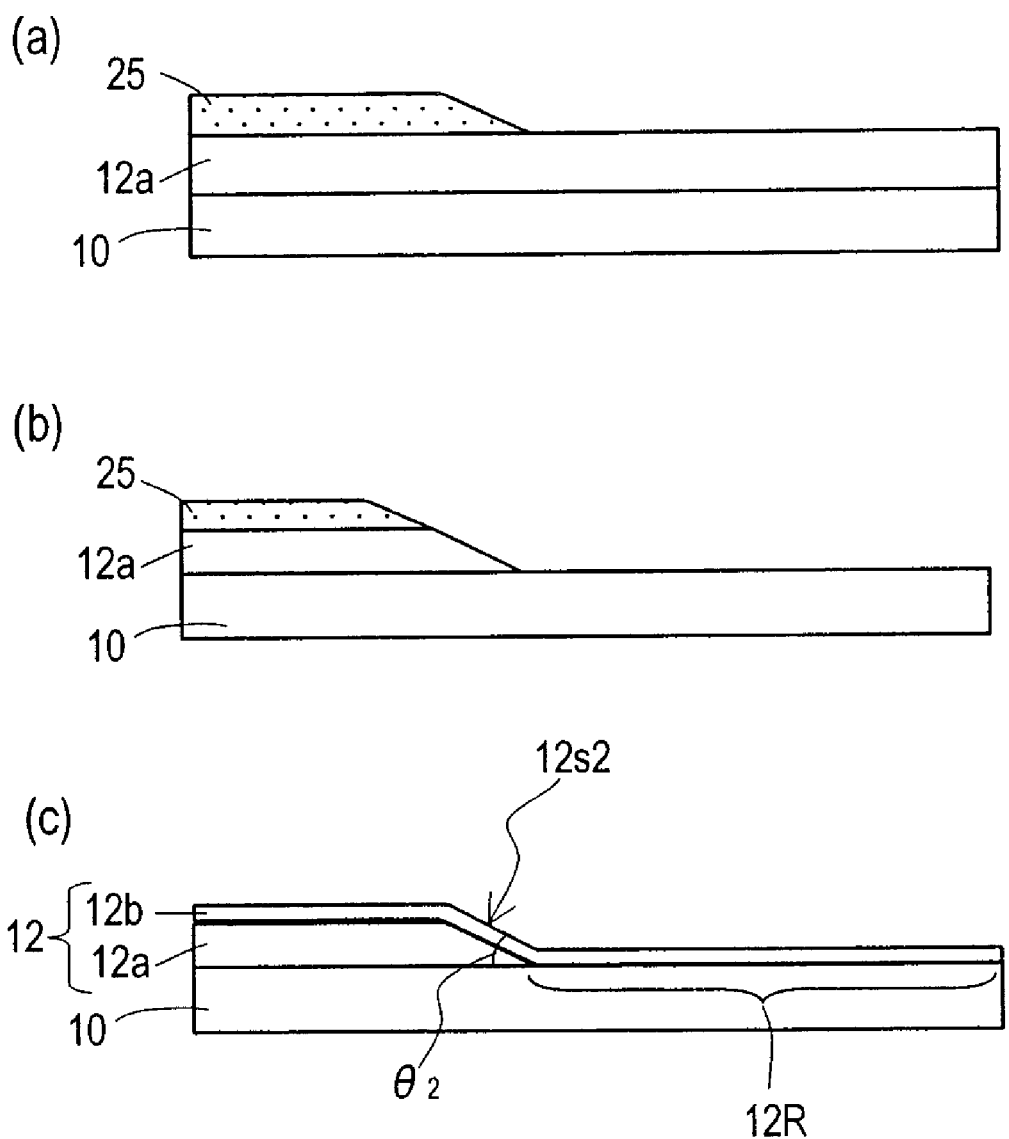
FIGS. 27(a) to (c) are views for explaining the reason why a tilt angle of a slope can be controlled by using a mask pattern as shown in FIG. 25 or FIG. 26.

When an end of the light-transmitting portion 72 is in the form of combteeth or pointed as shown in FIG. 25 or FIG. 26, the taper of the resist 25 to be subjected to development on the first insulating layer 12a can be made gentle, as shown in FIG. 27(a). If a highly-anisotropic etching (e.g., dry etching) is performed after forming the gently-tapered resist 25 in this manner, the taper of the resist 25 will be reflected on the taper of the first insulating layer 12a, as shown in FIG. 27(b), so that the taper of the first insulating layer 12a can be made gentle. Thereafter, the resist 25 is removed, and then the second insulating layer 12b is formed, whereby slopes including second portions 12s2 with a small tilt angle $\theta_2$ can be obtained, as shown in FIG. 27(c).

Embodiment 6

FIG. 28 and FIGS. 29(a) to (c) schematically show a liquid crystal display device 600 according to the present embodiment.

Figure 28:
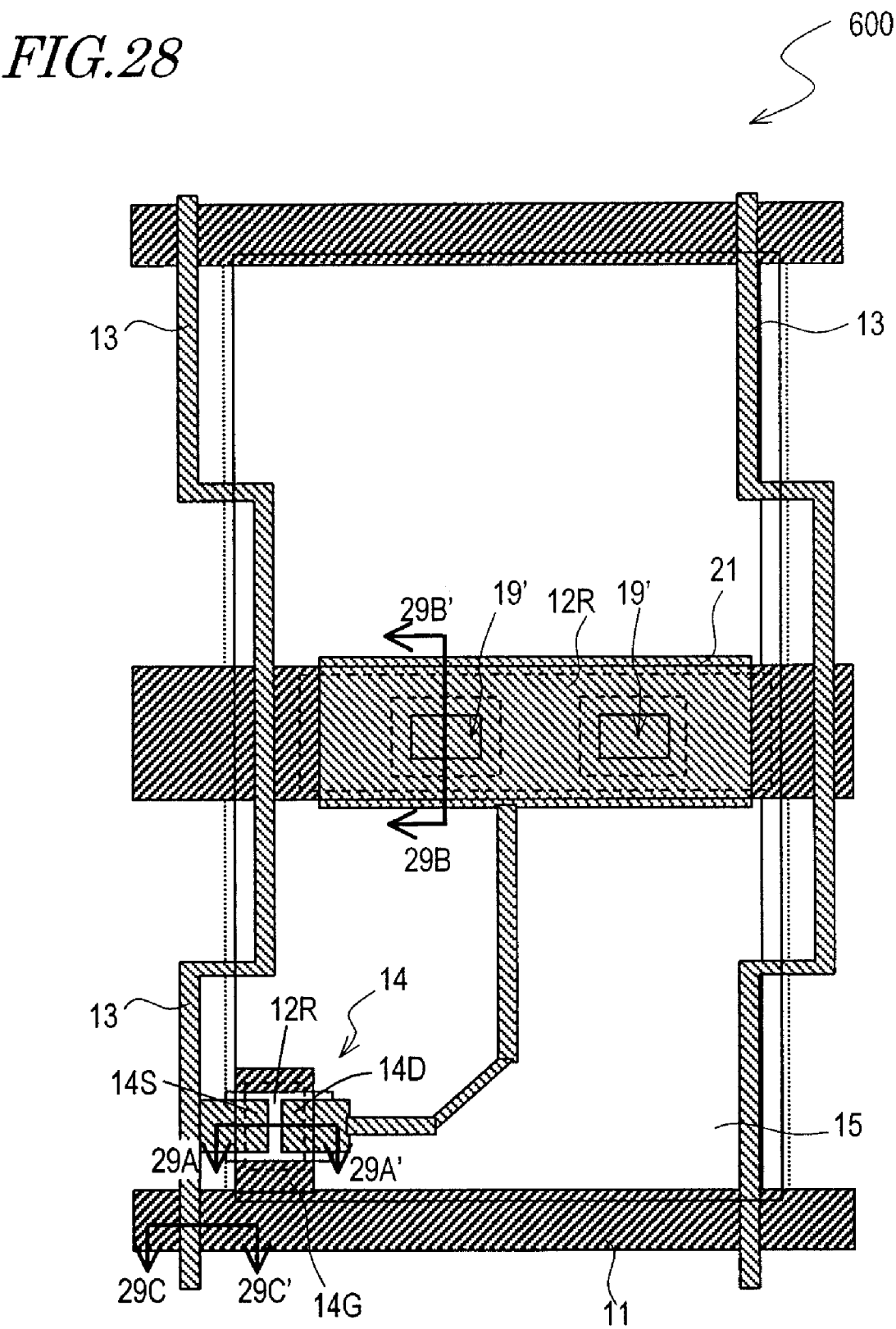
FIG. 28 is an upper plan view schematically showing a liquid crystal display device 600 according to a sixth embodiment of the present invention.
Figure 29:
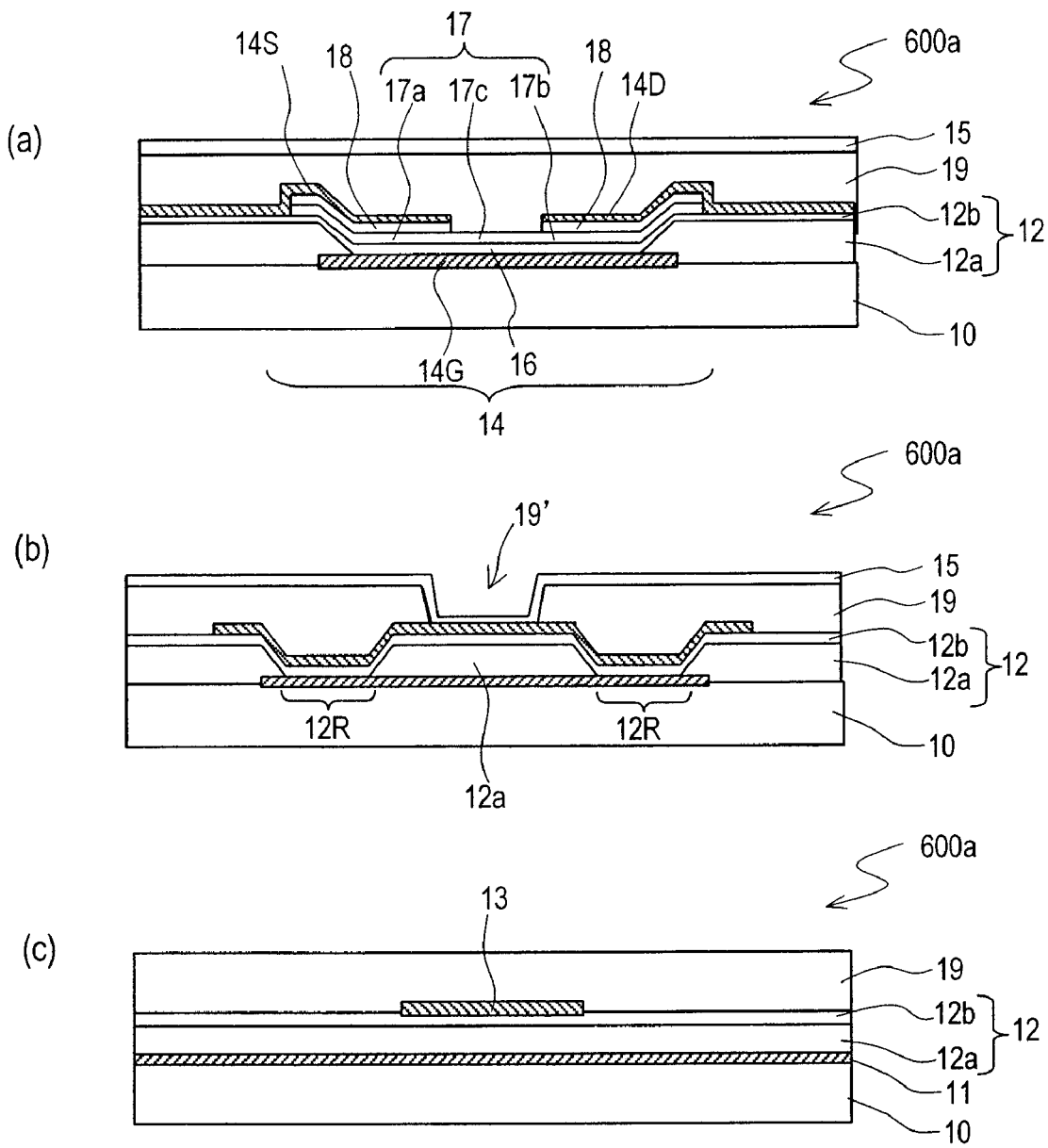
FIGS. 29(a) to (c) are cross-sectional views schematically showing a TFT substrate 600a of the liquid crystal display device 600, each showing a cross section taken along line 29A-29A', line 29B-29B', or line 29C-29C' in FIG. 28, respectively.

As shown in FIG. 28, FIGS. 29(a) and (c), a liquid crystal display device 600 of the TFT substrate 600a of the present embodiment has essentially the same construction as that of the TFT substrate 500a of the liquid crystal display device 500 of Embodiment 5.

However, as shown in FIG. 28 and FIG. 29(b), the TFT substrate 600a of the liquid crystal display device 600 differs from the TFT substrate 500a of the liquid crystal display device 500 in that low-stack regions 12R of the multilayer insulating film 12 are located so as not to overlap any contact holes 19' which are formed in the interlayer insulating film 19.

In the present embodiment, as shown in FIG. 29(b), the first insulating layer 12a located below the contact holes 19' is not removed, and the low-stack regions 12R of the multilayer insulating film 12 are located so as not to overlap the contact holes 19'. Such a construction makes it possible to reduce the time which is required for an exposure process of the interlayer insulating film 19', which is typically formed of a photosensitive material. Hereinafter, the reason thereof will be described.

Since the interlayer insulating film 19 is provided over essentially the entire surface of the TFT substrate 600a, it is preferable that the material of the interlayer insulating film 19 has a high transmittance. However, a material having a high transmittance requires a high energy for exposure. Generally speaking, about ten times as much energy is required as that for a resist material, although depending on the material and film thickness. Furthermore, due to its planarization effect, the interlayer insulating film 19 becomes thick above the low-stack regions 12R of the multilayer insulating film 12. Therefore, if the low-stack regions 12R were provided so as to overlap the contact holes 19', the energy required for the exposure process to form the contact holes 19' would become even higher, thus resulting in a longer exposure time and inviting a deterioration in the processing performance of the production line.

On the other hand, as in the present embodiment, by leaving intact the first insulating layer 12a below the contact holes 19' and locating the low-stack regions 12R of the multilayer insulating film 12 so as not to overlap the contact holes 19', an increase in the energy required for exposure can be prevented, and the exposure time can be reduced.

Embodiment 7

FIG. 30 and FIGS. 31(a) to (d) schematically show a liquid crystal display device 700 according to the present embodiment. The liquid crystal display device 700 of the present embodiment differs from the liquid crystal display device 500 of Embodiment 5 in that each pixel region is split into a plurality of subpixel regions.

Figure 30:
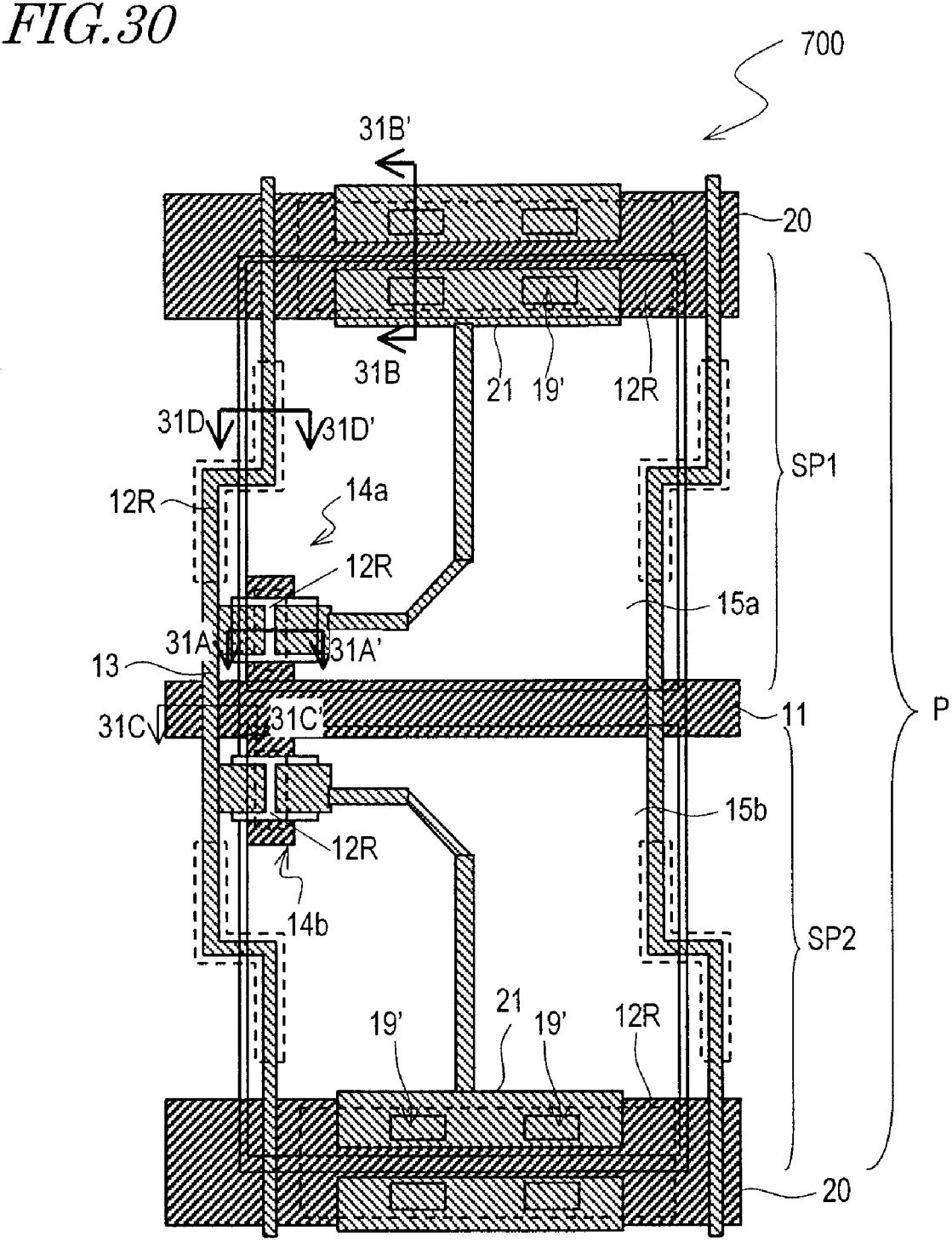
FIG. 30 is an upper plan view schematically showing a liquid crystal display device 700 according to a seventh embodiment of the present invention.
Figure 31:
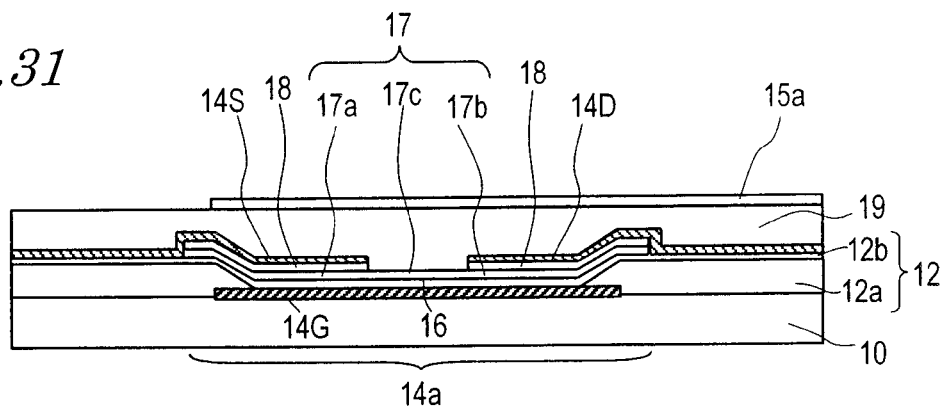
FIGS. 31(a) to (d) are cross-sectional views schematically showing a TFT substrate of the liquid crystal display device 700, each showing a cross section taken along line 31A-31A', line 31B-31B', line 31C-31C', or line 31D-31D' in FIG. 30, respectively.
Figure 31:
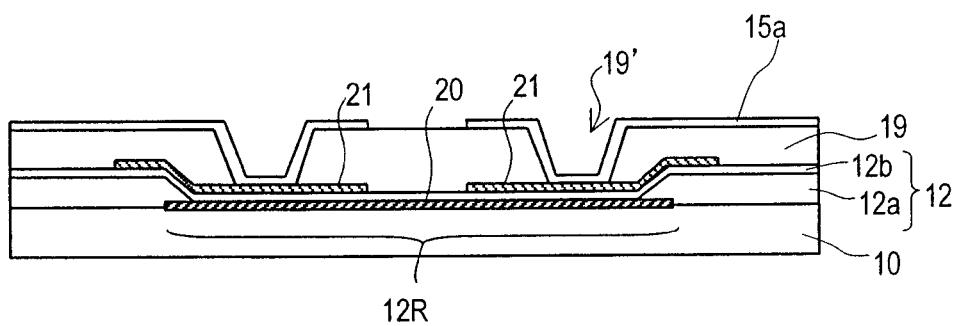
Figure 31:
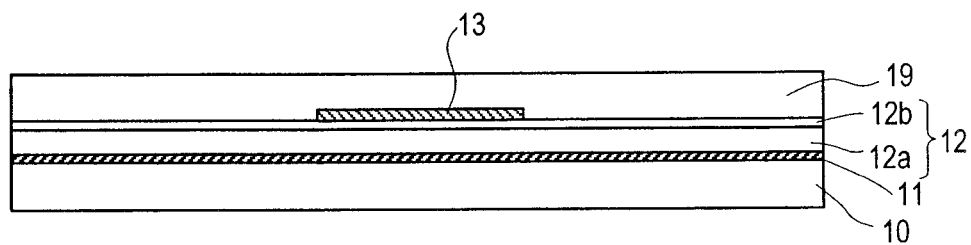
Figure 31:
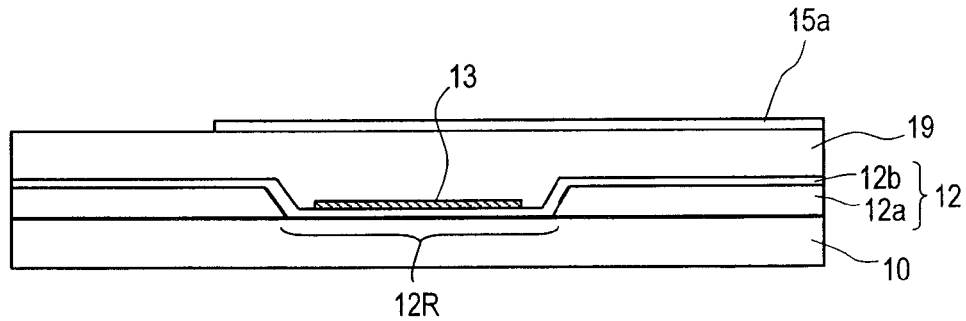

In the liquid crystal display device 700, as shown in FIG. 30, each pixel region P includes a first subpixel region SP1 and a second subpixel region SP2, to which different voltages can be applied. TFTs 14a and 14b and subpixel electrodes 15a and 15b are provided, respectively, in the first subpixel region SP1 and the second subpixel region SP2. Gate electrodes of the TFTs 14a and 14b are connected to the same (common) scanning line 11, and source electrodes of the TFTs 14a and 14b are connected to the same (common) signal line 13.

In each of the first subpixel region SP1 and the second subpixel region SP2 is provided a storage capacitor which is composed of a storage capacitor line 20, a storage capacitor electrode 21, and an insulating film 12 therebetween. As shown in FIG. 30, the storage capacitor line 20 composing the storage capacitor of the first subpixel region SP1 and the storage capacitor line 20 composing the storage capacitor of the second subpixel region SP2 are separate wiring lines, which are electrically independent. Thus, respectively different voltages can be supplied.

In each of the first subpixel region SP1 and the second subpixel region SP2, a liquid crystal capacitor (composed of a subpixel electrode, a counter electrode, and a liquid crystal layer) and the storage capacitor are connected in electrically parallel connection. Therefore, when different voltages are applied to the storage capacitor line 20 composing the storage capacitor of the first subpixel region SP1 and the storage capacitor line 20 composing the storage capacitor of the second subpixel region SP2, a difference can be obtained between the voltage to the subpixel electrode 15a of the first subpixel region SP1 and the voltage to the subpixel electrode 15b of the second subpixel region SP2. As a result, a difference can be obtained between the effective voltages which are applied across the liquid crystal layer 60 in the first subpixel region SP1 and the liquid crystal layer 60 in the second subpixel region SP2.

As described above, when each pixel region P is split into the plurality of subpixel regions SP1 and SP2 to which different voltages can be applied, the viewing angle dependence of the γ characteristics, i.e., the γ characteristics when the display surface is observed in the frontal direction differing from the γ characteristics when the display surface is observed in an oblique direction, can be reduced. Such a pixel division technique is disclosed in, for example, Japanese Laid-Open Patent Publication No. 2004-62146 and Japanese Laid-Open Patent Publication No. 2004-78157.

In the liquid crystal display device 700 designed with pixel division, too, as shown in FIG. 30 and FIGS. 31(a) to (d), a multilayer insulating film 12 having low-stack regions 12R located in predetermined positions may be used to reduce the capacitance which is formed in each intersection between a scanning line 11 and a signal line 13, without degradation of the driving ability of the TFTs 14a and 14b or decrease in the capacitance value of the storage capacitor.

Note that, as is disclosed in Japanese Laid-Open Patent Publication No. 2004-62146 and Japanese Laid-Open Patent Publication No. 2004-78157, supra, the pixel division technique is preferably used in a liquid crystal display device of the VA mode (e.g., the MVA mode or ASM mode) having wide viewing angle characteristics. Therefore, the pixel region P of the liquid crystal display device 700 preferably has a structure which enables displaying in the VA mode.

Embodiment 8

Figure 32:
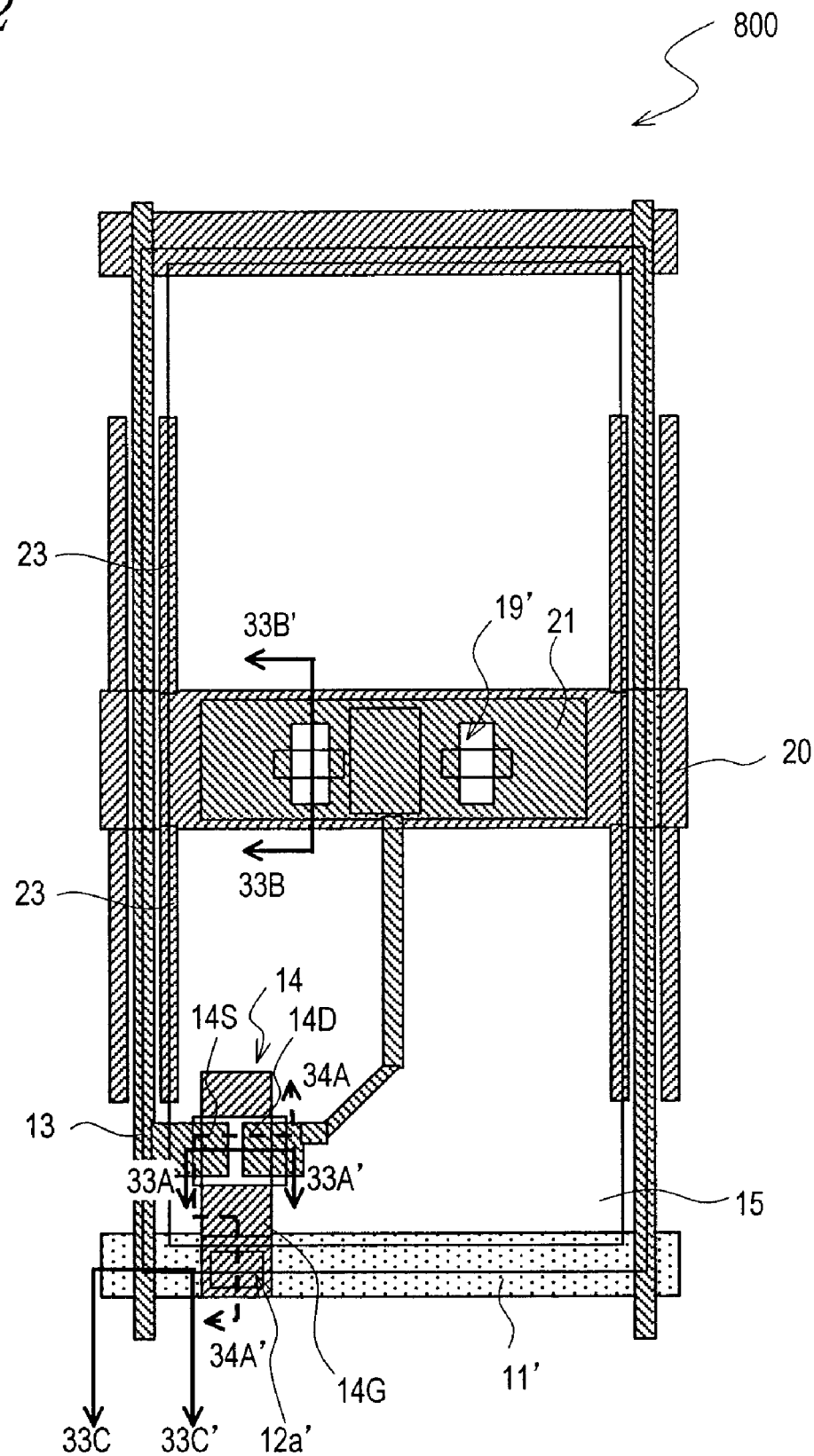
FIG. 32 is an upper plan view schematically showing a liquid crystal display device 800 according to an eighth embodiment of the present invention.
Figure 33:
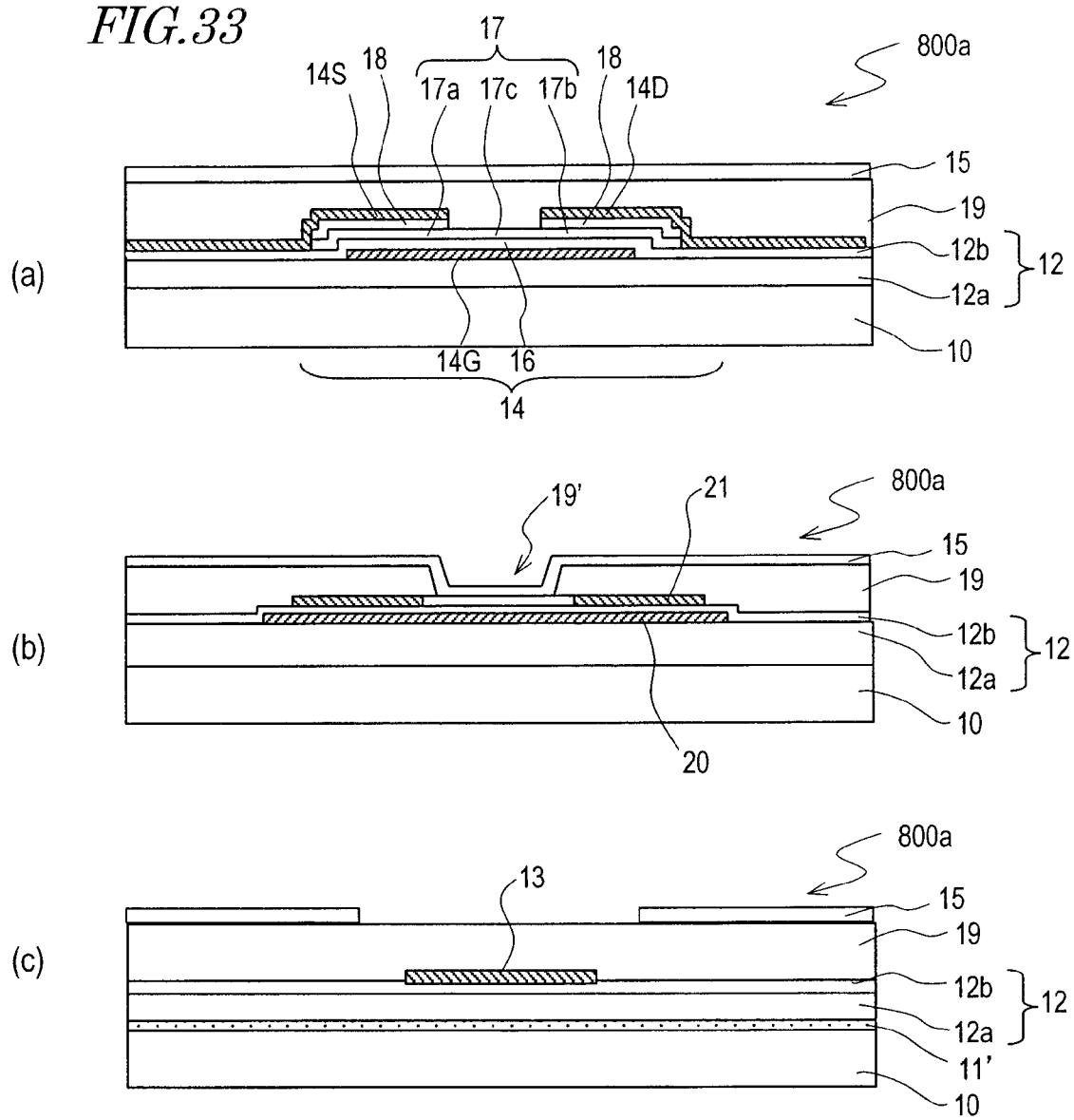
FIGS. 33(a) to (c) are cross-sectional views schematically showing a TFT substrate 800a of the liquid crystal display device 800, each showing a cross section taken along line 33A-33A', line 33B-33B', or line 33C-33C' in FIG. 32, respectively.

FIG. 32 and FIGS. 33(a) to (c) show a liquid crystal display device 800 according to the present embodiment. FIG. 32 is an upper plan view schematically showing one pixel region of the liquid crystal display device 800. FIGS. 33(a) to (c) are partial cross-sectional views schematically showing a TFT substrate 800a of the liquid crystal display device 800.

The TFT substrate 800a is similar to the TFT substrate 300a of Embodiment 3 in that the insulating film 12 covering each scanning line 11' is a multilayer insulating film including a first insulating layer 12a and a second insulating layer 12b, but differs from the TFT substrate 300a in terms of the relative locations of the scanning line 11' and the gate electrode 14G.

In the TFT substrate 300a of Embodiment 3, the scanning lines 11 and the gate electrodes 14G are formed in the same layer. On the other hand, in the TFT substrate 800a of the present embodiment, the scanning lines 11' and the gate electrodes 14G are formed of different conductive films, and are formed in separate layers from each other.

Specifically, as shown in FIG. 33(a), each gate electrode 14G is formed on the first insulating layer 12a covering a scanning line 11', and as shown in FIG. 32, electrically connected to the scanning line 11' at a contact hole 12a' which is provided in the first insulating layer 12a.

In other words, in the TFT substrate 300a of Embodiment 3, it is ensured that only the second insulating layer 12b functions as a gate insulating film 16 by providing each low-stack region 12R so as to overlap a channel region 17c; on the other hand, in the present embodiment, each gate electrode 14G is formed above the first insulating layer 12a in order to ensure that only the second insulating layer 12b functions as a gate insulating film 16.

Moreover, in the TFT substrate 800a, as shown in FIG. 33(b), each storage capacitor line 20 is also formed above the first insulating layer 12a, such that a storage capacitor electrode 21 opposes the storage capacitor line 20 via the second insulating layer 12b.

In the TFT substrate 800a of the present embodiment, as shown in FIG. 33(c), the insulating film 12 covering the scanning lines 11 is a multilayer insulating film including the first insulating layer 12a and the second insulating layer 12b, and the capacitance which is formed at each intersection between a scanning line 11 and a signal line 13 can be reduced. Moreover, as shown in FIGS. 33(a) and (b), the gate electrodes 14G and the storage capacitor lines 20 are formed above the first insulating layer 12a, and therefore degradation of the driving ability of the TFTs 14 or decrease in the capacitance values of the storage capacitors does not occur.

Next, an exemplary method for producing the TFT substrate 800a of the present embodiment will be described with reference to FIGS. 34(a) to (g).

Figure 34:
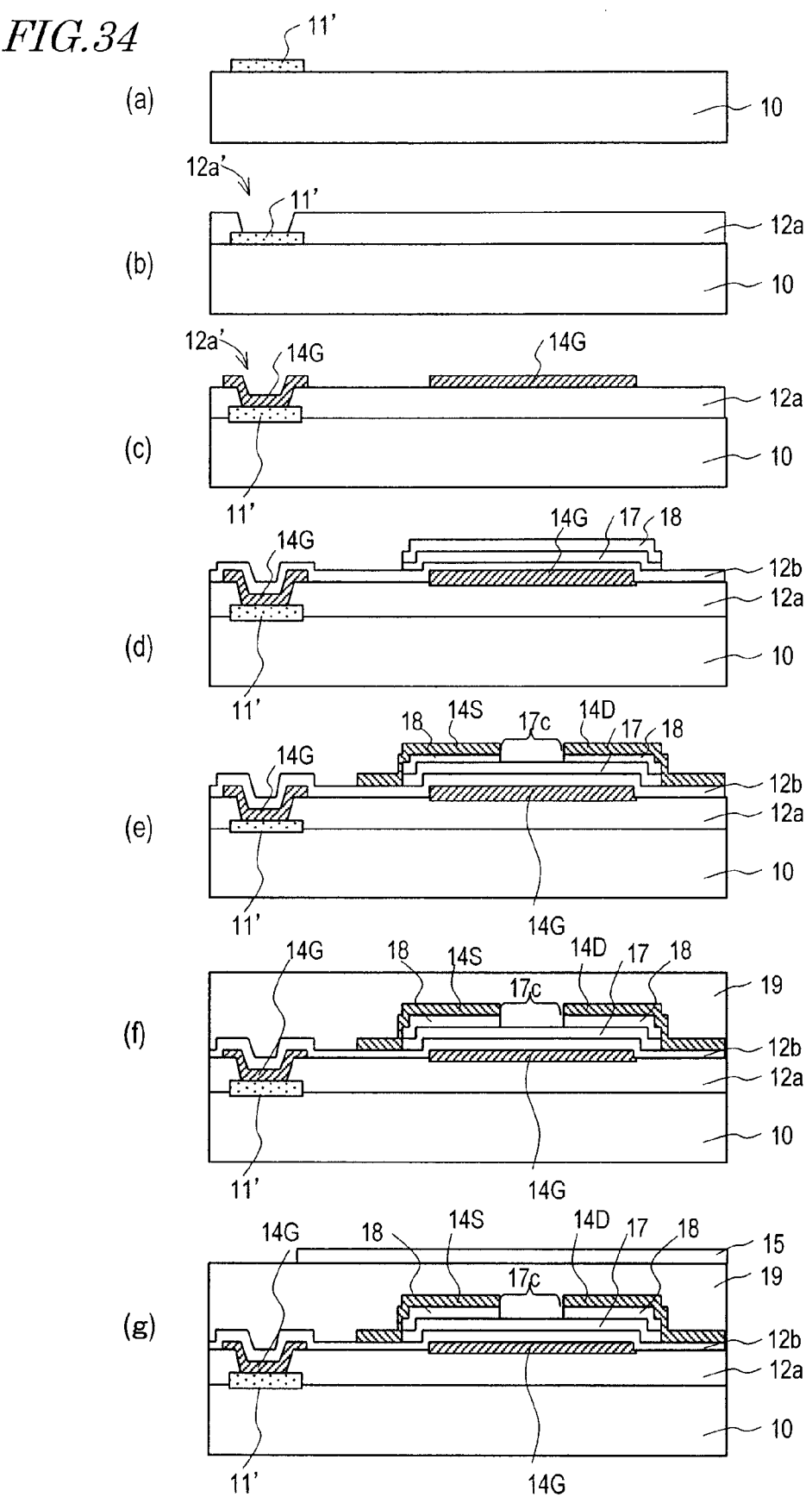
FIGS. 34(a) to (g) are step cross-sectional views schematically showing production steps for the TFT substrate 800a, each showing a cross section taken along line 34A-34A' in FIG. 32.

First, on an insulative substrate 10 such as a glass substrate, a conductive film is formed by using a sputtering technique, and this conductive film is patterned by using photolithography technique to form a scanning line 11', as shown in FIG. 34(a).

Next, an organic SOG material is applied on the substrate 10 by using spin coating technique, followed by a pre-baking and a post-baking to form the first insulating layer 12a. Thereafter, as shown in FIG. 34(b), by using photolithography technique, a contact hole 12a' is formed in a portion of the first insulating layer 12a above the scanning line 11'.

Then, a conductive film is formed by using sputtering technique, and this conductive film is patterned by using photolithography technique, thus forming a gate electrode 14G as shown in FIG. 34(c). At this time, a storage capacitor line 20 (not shown) is also formed concurrently.

Thereafter, by using CVD technique, an inorganic insulating film, an intrinsic semiconductor film, and an impurity-added semiconductor film are consecutively deposited. Thereafter, the intrinsic semiconductor film and the impurity-added semiconductor film are patterned by using photolithography technique. As a result, as shown in FIG. 34(d), an island-like semiconductor structure is formed which is composed of a second insulating layer 12b (a portion of which functions as a gate insulating film 16), an intrinsic semiconductor layer 17, and an impurity-added semiconductor layer 18.

Next, a conductive film is formed by sputtering technique, and this laminate film is patterned by photolithography technique, thus forming a source electrode 14S, a drain electrode 14D, a signal line 13, and a storage capacitor electrode 21.

Then, as shown in FIG. 34(e), in a region 17c to become a channel of the island-like semiconductor structure, the impurity-added semiconductor layer 18 is removed by dry etching, using the source electrode 14S and the drain electrode 14D as a mask. Note that, when removing the impurity-added semiconductor layer 18, the surface of the intrinsic semiconductor layer 17 is also slightly etched.

Thereafter, as shown in FIG. 34(f), CVD technique is used to form an interlayer insulating film 19 so as to cover essentially the entire surface of the substrate 10, and then photolithography technique is used to form a contact hole 19'.

Finally, a transparent conductive film (or a light-reflective conductive film) is formed by using sputtering technique, and this conductive film is patterned by using photolithography technique, whereby a pixel electrode 15 is formed as shown in FIG. 34(g). Thus, the TFT substrate 400a is completed.

Note that the present invention is not limited to the structure illustrated in Embodiments 1 to 8 described above. For example, as a TFT to be provided in each pixel region, a TFT of the structure shown in FIG. 35(a) or (b) or FIG. 36(a) or (b) may also be used.

Figure 35:
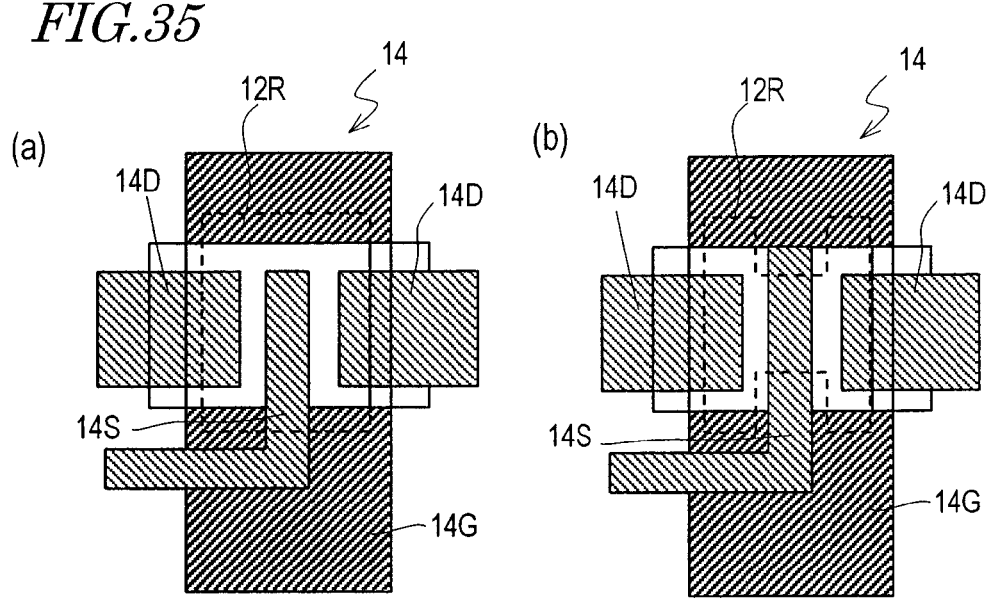
FIGS. 35(a) and (b) are diagrams each showing an exemplary TFT provided in each pixel region.

A TFT 14 shown in FIG. 35(a) includes two drain electrodes 14D, with a source electrode 14S being located between the two drain electrodes 14D. Such a construction allows any change in the gate-drain capacitance to be cancelled between the two drain electrodes 14D. Therefore, even if a misalignment of the photomask occurs, changes in the gate-drain capacitance of the overall TFT 14 can be suppressed.

A TFT 14 shown in FIG. 35(b) also includes two drain electrodes 14D. Therefore, as in the TFT 14 shown in FIG. 35(a), changes in the gate-drain capacitance can be suppressed in the event of a misalignment of the photomask.

In the construction shown in FIG. 35(a), a rectangular low-stack region 12R is provided so as to overlap the channel region of the TFT 14. On the other hand, in the construction shown in FIG. 35(b), a low-stack region 12R which is provided so as to overlap the channel region has a rectangular shape with notches being made in portions thereof. Specifically, as shown in FIG. 35(b), the low-stack region 12R has an H-shape which is notched in some of the portions overlapping the source electrode 14S. As a result, the first insulating film 12a is formed in some of the portion between the source electrode 14S and the gate electrode 14G within the channel region. Thus, with the construction shown in FIG. 35(b), the gate-source capacitance is reduced as compared to the construction shown in FIG. 35(a).

Figure 36:
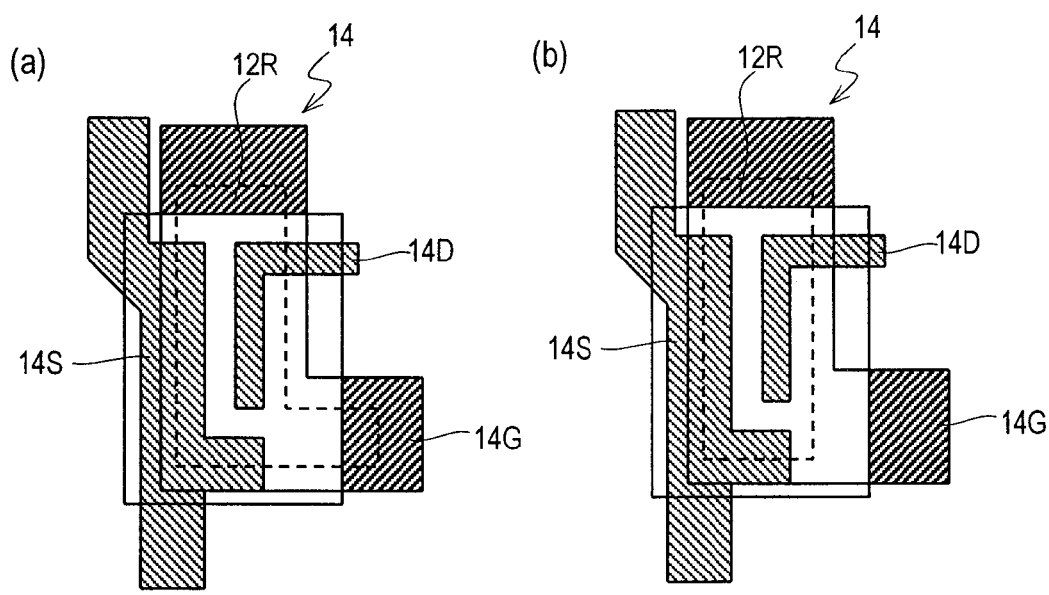
FIGS. 36(a) and (b) are diagrams each showing an exemplary TFT provided in each pixel region.

In each of the TFTs 14 shown in FIGS. 36(a) and (b), the drain electrode 14D is formed in an L-shape, such that the drain has a thin lead portion. As a result, changes in the gate-drain capacitance can be suppressed in the event of a misalignment of the photomask.

In the construction shown in FIG. 36(b), the rectangular low-stack region 12R is provided so as to overlap the channel region of the TFT 14. On the other hand, in the construction shown in FIG. 36(a), a low-stack region 12R which is formed so as to overlap the channel region is formed in an L-shape so as to overlap a greater portion of the gate electrode 14G within the channel region. As a result, in the construction shown in FIG. 36(a), there is more semiconductor region that receives a sufficient gate voltage applied thereto than in the construction shown in FIG. 36(b), so that the OFF characteristics of the TFT 14 can be improved by preventing the OFF-leak of the TFT 14.

In Embodiments 1 to 8, the present invention was described with respect to liquid crystal display devices which include a liquid crystal layer as a display medium layer and active matrix substrates for liquid crystal display devices. However, the present invention is not limited thereto. The present invention is suitably used in active matrix substrates for various display devices, such as organic EL display devices.

According to the present invention, there are provided: an active matrix substrate which can reduce the capacitance formed at each intersection between a scanning line and a signal line, without causing an increase in the wiring resistance or a degradation of the driving ability of switching elements; and a display device including the same.

The invention claimed is:

1. An active matrix substrate comprising:
   a substrate;
   a plurality of scanning lines arranged on the substrate;
   an insulating film covering the plurality of scanning lines;
   a plurality of signal lines intersecting the plurality of scanning lines via the insulating film;
   a plurality of switching elements arranged on the substrate, each operating in response to a signal which is applied to the corresponding scanning line; and
   a plurality of pixel electrodes each capable of being electrically connected to the corresponding signal line via the plurality of switching elements, wherein, the insulating film is a multilayer insulating film including a first insulating layer and a second insulating layer;
   the first insulating layer is made of an insulating material containing an organic component;
   the multilayer insulating film has a low-stack region in at least a portion of a region overlapping each switching element, the first insulating layer not being located in the low-stack region; and
   the first insulating layer is arranged to underlie the second insulating layer.

2. The active matrix substrate of claim 1, wherein the second insulating layer is formed of an inorganic insulating material.

3. The active matrix substrate of claim 1, wherein each of the plurality of switching elements is a thin film transistor having: a semiconductor layer including a channel region; a gate electrode electrically connected to the corresponding scanning line; a source electrode electrically connected to the corresponding signal line; and a drain electrode electrically connected to the corresponding pixel electrode.

4. The active matrix substrate of claim 3, wherein the multilayer insulating film has each low-stack region in a region overlapping at least the channel region.

5. The active matrix substrate of claim 3, wherein,
   the second insulating layer is formed over substantially the entire surface of the substrate; and
   the second insulating layer has portions each located between the gate electrode and the semiconductor layer, each portion functioning as a gate insulating film.

6. The active matrix substrate of claim 3, wherein an edge of the gate electrode is covered by the first insulating layer.

7. The active matrix substrate of claim 6, wherein,
   a surface of the multilayer insulating film facing the signal lines is recessed in each low-stack region; and
   the semiconductor layer is formed so as to cover each low-stack region of the multilayer insulating film overlapping the channel region, in such a manner that a portion of the semiconductor layer rides over a region of the multilayer insulating film where the first insulating layer is formed.

8. The active matrix substrate of claim 1, further comprising:
   a plurality of storage capacitor lines formed on the substrate; and
   a plurality of storage capacitor electrodes opposing the plurality of storage capacitor lines via the insulating film, wherein,
   the multilayer insulating film also includes low-stack regions in between the storage capacitor lines and the storage capacitor electrodes.

9. The active matrix substrate of claim 8, wherein edges of the storage capacitor lines are covered by the first insulating layer.

10. The active matrix substrate of claim 1, wherein the multilayer insulating film also includes low-stack regions in portions of regions overlapping the signal lines.

11. The active matrix substrate of claim 10, wherein the multilayer insulating film does not include any low-stack regions at intersections between the signal lines and the scanning lines.

12. The active matrix substrate of claim 10, wherein,
   the multilayer insulating film has slopes surrounding each low-stack region overlapping the signal lines;
   the slopes include a first portion parallel to a direction in which the signal lines extend, and a second portion substantially orthogonal to the direction in which the signal lines extend; and
   a tilt angle of the first portions with respect to a principal face of the substrate is greater than a tilt angle of the second portions with respect to the principal face of the substrate.

13. The active matrix substrate of claim 1, further comprising an interlayer insulating film formed of a photosensitive material so as to cover the plurality of signal lines and the plurality of switching elements, wherein,
   the plurality of pixel electrodes are formed on the interlayer insulating film;
   each of the plurality of pixel electrodes is connected to the corresponding switching element at a contact hole which is formed in the interlayer insulating film; and
   the multilayer insulating film does not have any low-stack region in a region overlapping the contact hole.

14. The active matrix substrate of claim 1, having a plurality of pixel regions arrayed in a matrix, wherein the plurality of pixel electrodes are respectively provided in the plurality of pixel regions.

15. The active matrix substrate of claim 14, having a display region defined by the plurality of pixel regions and a non-display region located around a perimeter of the display region, the non-display region having a plurality of terminals to which signals for driving the plurality of pixel regions are input, wherein,
   the multilayer insulating film has a low-stack region over substantially the entire surface of the non-display region.

16. The active matrix substrate of claim 14, wherein the multilayer insulating film has an annular low-stack region near an outer periphery of each of the plurality of pixel regions.

17. The active matrix substrate of claim 1, wherein the first insulating layer is thicker than the second insulating layer, and has a lower relative dielectric constant than that of the second insulating layer.

18. The active matrix substrate of claim 1, wherein the first insulating layer has a thickness of no less than 1.0 μm and no more than 4.0 μm.

19. The active matrix substrate of claim 1, wherein the first insulating layer has a relative dielectric constant of 4.0 or less.

20. The active matrix substrate of claim 1, wherein the first insulating layer is formed of a spin-on-glass (SOG) material having an Si—O—C bond backbone.

21. The active matrix substrate of claim 1, wherein the first insulating layer is formed of a spin-on-glass (SOG) material having an Si—C bond backbone.

22. The active matrix substrate of claim 1, wherein the first insulating layer is formed of a spin-on-glass (SOG) material containing a filler composed of silica.

23. The active matrix substrate of claim 1, wherein the plurality of scanning lines have a wiring layer on at least the insulating film side, the wiring layer being composed of Ti or TiN.

24. The active matrix substrate of claim 1, having a plurality of shield electrodes extending substantially parallel to the plurality of signal lines.

25. The active matrix substrate of claim 24, wherein the plurality of shield electrodes are located so as to overlap edges of the plurality of pixel electrodes.

26. A display device comprising: the active matrix substrate of claim 1; and a display medium layer located on the active matrix substrate.

27. The display device of claim 26, further comprising a counter substrate which opposes the active matrix substrate via the display medium layer, the display medium layer being a liquid crystal layer.

* * * * *